United States Patent
Yoo et al.

(10) Patent No.: US 12,483,705 B2
(45) Date of Patent: Nov. 25, 2025

(54) IMAGE DECODING METHOD AND DEVICE

(71) Applicant: LG ELECTRONICS INC., Seoul (KR)

(72) Inventors: Sunmi Yoo, Seoul (KR); Junghak Nam, Seoul (KR); Jungah Choi, Daejeon (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/833,579

(22) PCT Filed: Jan. 10, 2023

(86) PCT No.: PCT/KR2023/000455
§ 371 (c)(1),
(2) Date: Jul. 26, 2024

(87) PCT Pub. No.: WO2023/146164
PCT Pub. Date: Aug. 3, 2023

(65) Prior Publication Data
US 2025/0133212 A1    Apr. 24, 2025

Related U.S. Application Data

(60) Provisional application No. 63/303,920, filed on Jan. 27, 2022.

(51) Int. Cl.
*H04N 7/12* (2006.01)
*H04N 19/105* (2014.01)
*H04N 19/132* (2014.01)
*H04N 19/176* (2014.01)

(52) U.S. Cl.
CPC ......... *H04N 19/132* (2014.11); *H04N 19/105* (2014.11); *H04N 19/176* (2014.11)

(58) Field of Classification Search
CPC .................................................. H04N 19/176
See application file for complete search history.

(56) References Cited

U.S. PATENT DOCUMENTS

2020/0275121 A1    8/2020    Zhao et al.
2021/0067807 A1    3/2021    Lainema

FOREIGN PATENT DOCUMENTS

| JP | 2019522448 A | 8/2019 |
| WO | 2020185039 A1 | 9/2020 |
| WO | 2021040486 A1 | 4/2021 |

*Primary Examiner* — Y Lee
(74) *Attorney, Agent, or Firm* — Bryan Cave Leighton Paisner LLP

(57) ABSTRACT

An image decoding method performed by a decoding device according to the present disclosure comprises the steps of: deriving neighboring samples for sign prediction of a current block; deriving costs of sign combination candidates for transform coefficients of the current block on the basis of the neighboring samples; predicting signs of the transform coefficients from the sign combination candidates on the basis of the costs; deriving residual samples of the current block on the basis of the predicted signs; and generating a reconstructed picture on the basis of the residual samples.

14 Claims, 15 Drawing Sheets

IMAGE DECODING METHOD AND DEVICE

CROSS-REFERENCE TO RELATED APPLICATIONS

This application is the National Stage filing under 35 U.S.C. 371 of International Application No. PCT/KR2023/000455, filed on Jan. 10, 2023, which claims the benefit of U.S. Patent Application No. 63/303,920 filed on Jan. 27, 2022, which is hereby incorporated by reference herein in its entirety.

TECHNICAL FIELD

This document relates to image coding technology, and more specifically, to a video decoding method and device for coding video information by predicting sign information of the transform coefficient in a video coding system.

BACKGROUND

Recently, demand for high-resolution, high-quality video/images such as 4K or 8K or higher UHD (Ultra High Definition) videos/images is increasing in various fields. As video/image data becomes higher resolution and higher quality, the amount of information or bits transmitted increases relative to existing video/image data, when transmitting image data using media such as existing wired or wireless broadband lines or storing video/image data using existing storage media, transmission and storage costs increase.

In addition, interest in and demand for immersive media such as VR (Virtual Reality), AR (Artificial Reality) content and holograms is increasing, broadcasting of videos/images with image characteristics different from real images, such as game images, is increasing.

Accordingly, highly efficient image compression technology is required to effectively compress, transmit, store, and reproduce high-resolution, high-quality video/image information having the various characteristics described above.

SUMMARY

The present disclosure provides a method and apparatus for improving video/image coding efficiency.

Another technical task of this document is to provide a method and device for performing sign prediction for the current block.

Another technical task of this document is to provide a method and device for deriving the cost of sign combination candidates for sign prediction.

According to an embodiment of this document, an image decoding method performed by a decoding device is provided. The method comprises deriving neighboring samples for sign prediction of the current block, deriving costs of sign combination candidates of transform coefficients of the current block based on the neighboring samples, predicting signs of the transform coefficients from the sign combination candidates based on the costs, deriving residual samples of the current block based on the predicted signs, and generating a reconstructed picture based on the residual samples.

According to another embodiment of this document, a decoding device that performs video decoding is provided. The decoding device includes a memory and at least one processor connected to the memory, the at least one processor is configured to derive neighboring samples for sign prediction of the current block, derive the costs of sign combination candidates of the transform coefficients of the current block based on the neighboring samples, predict the signs of the transform coefficients from the sign combination candidates based on the costs, derive residual samples of the current block based on the predicted signs, and generate a reconstructed picture based on the residual samples According to another embodiment of this document, a video encoding method performed by an encoding device is provided. The method comprises deriving neighboring samples for sign prediction based on the size or prediction mode of the current block, deriving costs of sign combination candidates of transform coefficients of the current block based on the neighboring samples, predicting signs of the transform coefficients from the sign combination candidates based on the costs, encoding residual information of the current block including syntax elements for the predicted signs, among the syntax elements, the target syntax element indicates whether the predicted sign of the transform coefficient for the target syntax element is accurate.

According to another embodiment of this document, a video encoding device is provided. The encoding device includes a memory and at least one processor connected to the memory, the at least one processor is configured to derive neighboring samples for sign prediction based on the size or prediction mode of the current block, derive the costs of sign combination candidates of the transform coefficients of the current block based on the neighboring samples, predict the signs of the transform coefficients from the sign combination candidates based on the costs, and encode residual information of the current block containing syntax elements for the predicted signs, among the syntax elements, the target syntax element is characterized in that it indicates whether the predicted sign of the transform coefficient for the target syntax element is accurate.

According to another embodiment of this document, a digital storage medium is provided. The digital storage medium can store a bitstream including residual information encoded by the image encoding method according to this document.

According to another embodiment of this document, a method for transmitting data for images is provided. The data transmission method comprises obtaining a bitstream of image information including residual information including syntax elements for predicted signs of transform coefficients of the current block, and transmitting the data including the bitstream of the image information including the residual information, among the syntax elements, the target syntax element indicates whether the predicted sign of the transform coefficient for the target syntax element is accurate, the predicted signs are derived based on deriving neighboring samples for sign prediction based on the size or prediction mode of the current block, deriving costs of sign combination candidates of the transform coefficients based on the neighboring samples, and predicting the signs of the transform coefficients from the sign combination candidates based on the costs According to another embodiment of this document, an apparatus for transmitting data for images is provided. The device includes at least one processor for obtaining a bitstream of image information including residual information including syntax elements for predicted signs of transform coefficients of the current block, and a transmitter that transmits the data including the bitstream of the image information including the residual information, among the syntax elements, the target syntax element indicates whether the predicted sign of the transform coefficient for the target syntax element is accurate, the predicted signs are derived based on deriving neighboring samples for sign prediction based on the size or prediction mode of the current block, deriving the costs of sign combination candidates of the transform coefficients based on the neighboring samples, and predicting the signs of the transform coefficients from the sign combination candidates based on the costs.

According to this document, neighboring samples can be determined to derive the cost for sign combination candidates based on the size of the current block, through this, sign prediction accuracy can be improved by reflecting the characteristics of the image, and coding efficiency can be improved by reducing the complexity of cost calculation.

According to this document, neighboring samples can be determined to derive the cost for sign combination candidates based on the intra prediction mode of the current block, through this, sign prediction accuracy can be improved by reflecting the characteristics of the image, and coding efficiency can be improved by reducing the complexity of cost calculation.

According to this document, when inter prediction is applied to the current block, the cost for the sign combination candidate can be derived using the neighboring sample of the predicted block, and through this, sign prediction accuracy can be improved by reflecting the characteristics of the image and coding efficiency can be improved.

DETAILED DESCRIPTION

Figure 1:
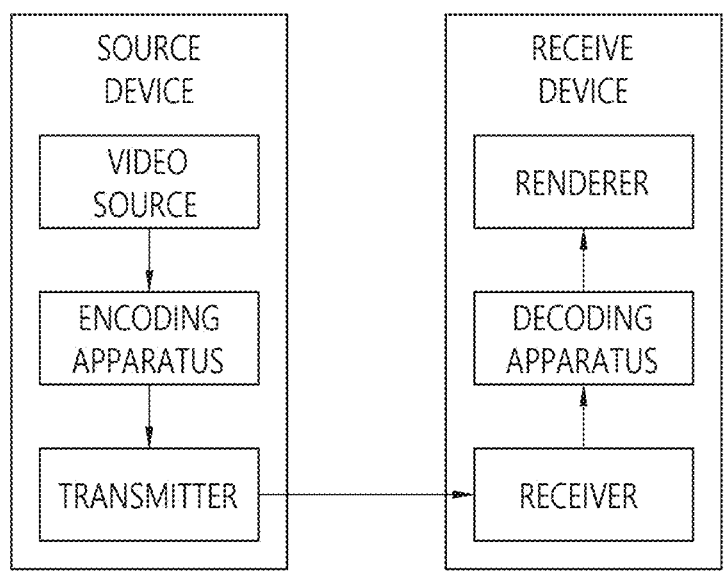
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals may be used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (i.e., intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

Figure 2:
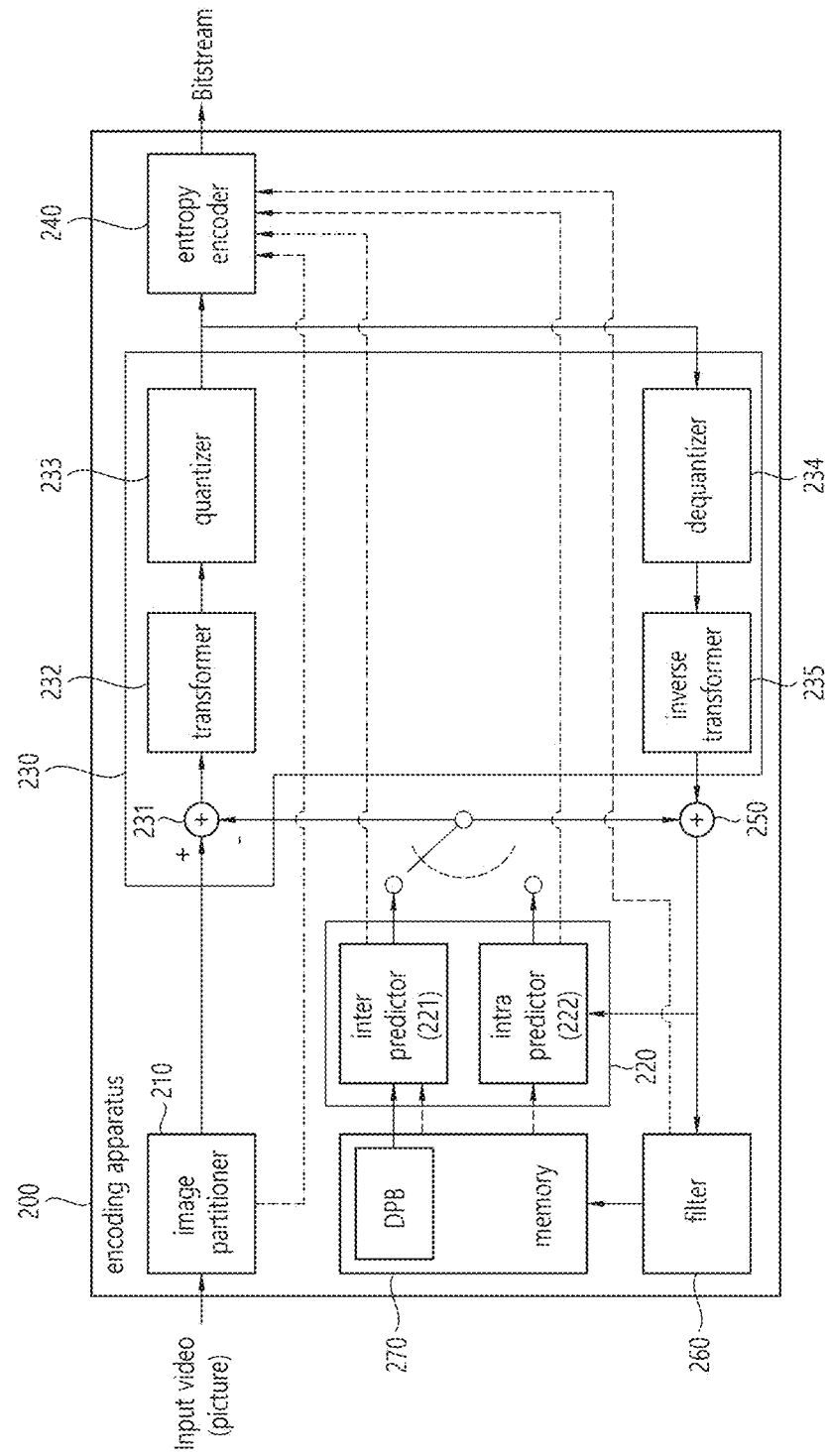
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
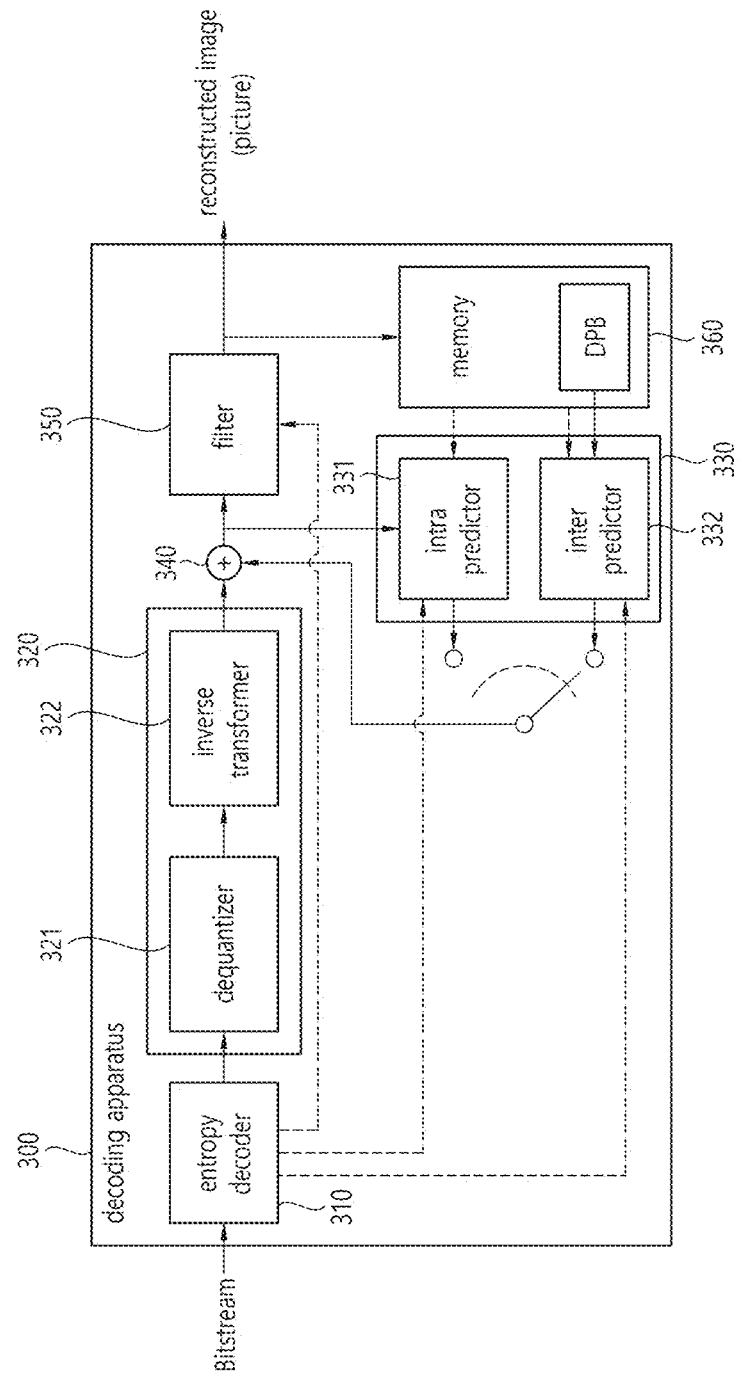
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

Meanwhile, as described above, when performing video coding, prediction is performed to increase compression efficiency. Through this, a predicted block containing prediction samples for the current block, which is the coding target block, can be generated. For example, when the above-described intra prediction is performed, the correlation between samples can be used and the difference between the original block and the prediction block, that is, the residual, can be obtained. The above-described transformation and quantization can be applied to the residual, through which spatial redundancy can be removed. Specifically, the encoding method and decoding method in which intra prediction is used may be as described later.

Figure 4:
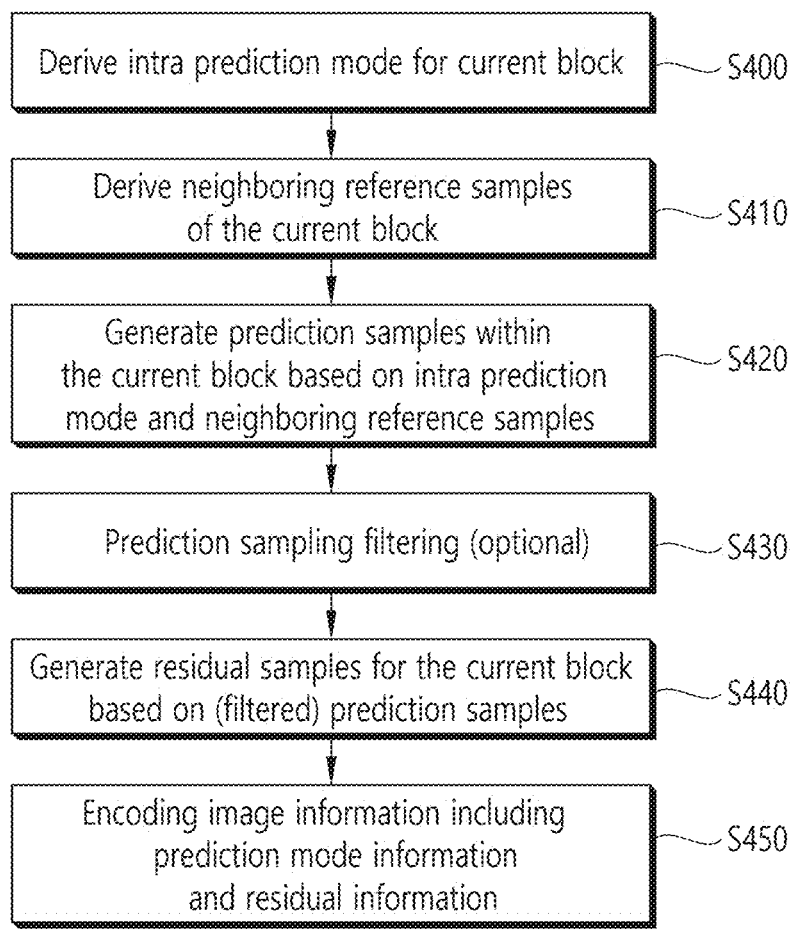
FIG. 4 shows an example of an intra prediction-based image encoding method.

FIG. 4 shows an example of an intra prediction-based image encoding method. Referring to FIG. 4, the encoding device may derive an intra prediction mode for the current block (S400) and derive neighboring reference samples of the current block (S410). The encoding device can determine the best intra prediction mode in which bit rate and distortion are optimized for the current block. The encoding device may generate prediction samples within the current block based on the intra prediction mode and the neighboring reference samples (S420). In this case, the encoding device may perform a prediction sample filtering procedure (S430). Predictive sample filtering can be called post filtering. Some or all of the prediction samples may be filtered by the prediction sample filtering procedure. In some cases, procedure S430 may be omitted.

The encoding device may generate residual samples for the current block based on the (filtered) prediction sample (S440). The encoding device may encode image information including prediction mode information indicating the intra prediction mode and residual information about the residual samples (S450). Encoded image information can be output in bitstream form. The output bitstream may be transmitted to a decoding device through a storage medium or network.

Figure 5:
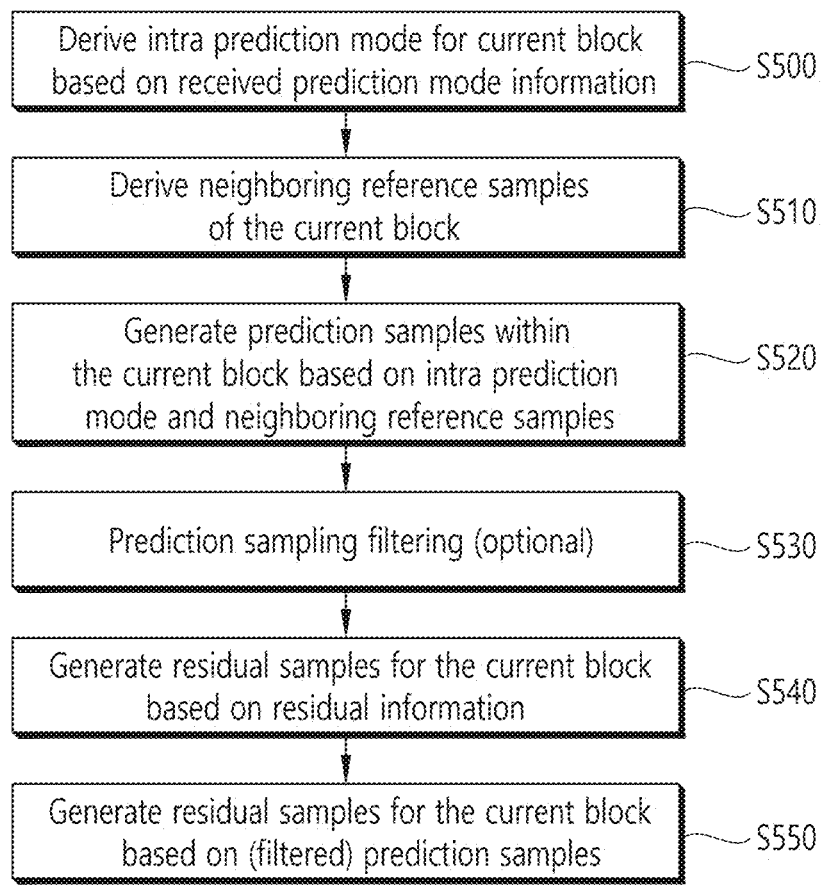
FIG. 5 shows an example of an intra prediction-based image decoding method.

FIG. 5 shows an example of an intra prediction-based image decoding method. Referring to FIG. 5, the decoding device can perform operations corresponding to the operations performed by the encoding device. For example, the decoding device may derive the intra prediction mode for the current block based on the received prediction mode information (S500). The decoding device may derive neighboring reference samples of the current block (S510). The decoding device may generate prediction samples within the current block based on the intra prediction mode and the neighboring reference samples (S520). In this case, the decoding device may perform a prediction sample filtering procedure (S530). Predictive sample filtering can be called post filtering. Some or all of the prediction samples may be filtered by the prediction sample filtering procedure. In some cases, the S530 procedure may be omitted.

The decoding device may generate residual samples for the current block based on the received residual information (S540). The decoding device may generate reconstructed samples for the current block based on the (filtered) prediction samples and the residual samples and generate a reconstructed picture based on these (S550).

Meanwhile, when intra prediction is applied to the current block, as described above, the encoding device/decoding device can derive an intra prediction mode for the current block, a prediction sample of the current block can be derived based on the intra prediction mode. That is, the encoding device/decoding device may derive the prediction sample of the current block by applying a directional mode or a non-directional mode based on the neighboring reference sample of the current block.

For reference, for example, the intra prediction mode may include two non-directional (or non-angular) intra prediction modes and 65 directional (or angular) intra prediction modes. The non-directional intra prediction modes may include a planar intra prediction mode of number 0 and a DC intra prediction mode of number 1, the directional intra prediction modes may include 65 intra prediction modes numbered 2 to 66. However, this is an example and this document can be applied even when the number of intra prediction modes is different. Meanwhile, in some cases, the 67th intra prediction mode may be further used, and the 67th intra prediction mode may represent a linear model (LM) mode.

Figure 6:
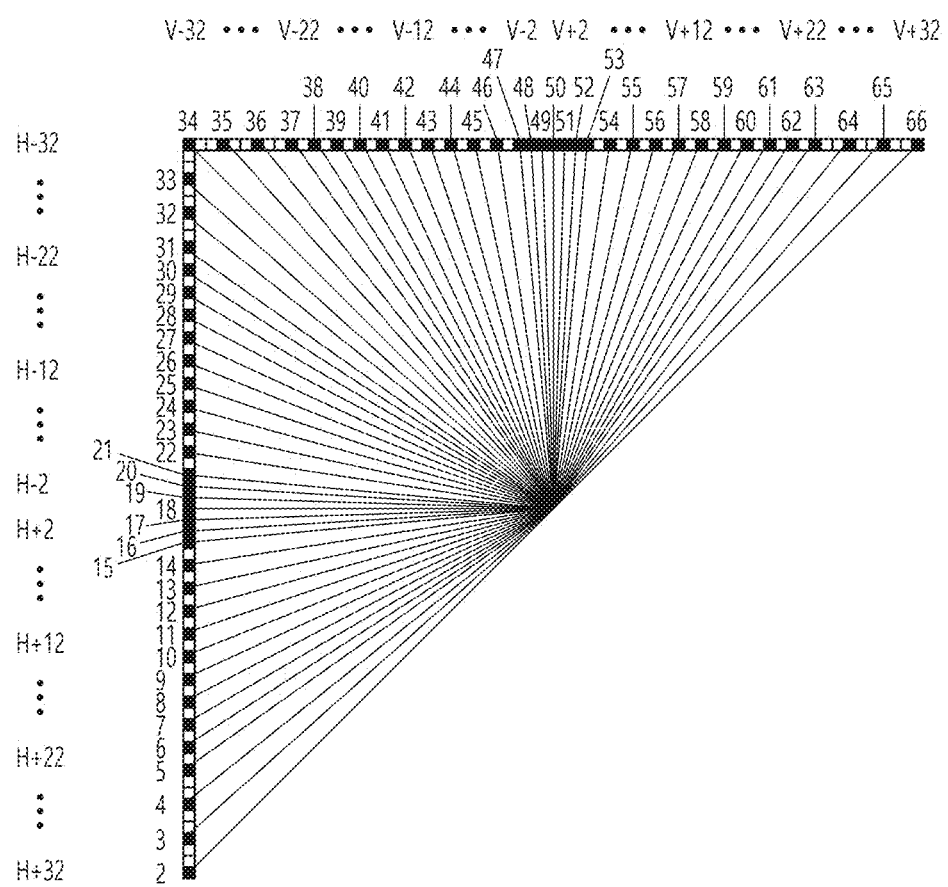
FIG. 6 exemplarily shows intra directional modes of 65 prediction directions.

FIG. 6 exemplarily shows intra directional modes of 65 prediction directions.

Referring to FIG. 6, an intra prediction mode with horizontal directionality and an intra prediction mode with vertical directionality can be distinguished centering on the 34th intra prediction mode with an upward-left diagonal prediction direction. H and V in FIG. 6 mean horizontal directionality and vertical directionality, respectively, the numbers −32 to 32 represent displacement in units of 1/32 on the sample grid position. The 2nd to 33th intra prediction modes have horizontal directionality, and the 34th to 66th intra prediction modes have vertical directionality. The 18th intra prediction mode and the 50th intra prediction mode represent the horizontal intra prediction mode and vertical intra prediction mode, respectively, the 2nd intra prediction mode may be called a downward-left diagonal intra prediction mode, the 34th intra prediction mode may be called an upward-left diagonal intra prediction mode, and the 66th intra prediction mode may be called an upward-right diagonal intra prediction mode.

Additionally, the encoding device and the decoding device can perform sign prediction on residual coefficients. For example, the encoding device and the decoding device can predict signs for a limited number of residual coefficients per block. Here, the block may be CU or TU, and the residual coefficient may be called a transform coefficient.

For example, when n signs are predicted in the current block, the encoding apparatus and decoding apparatus can calculate costs for $2^n$ sign combination hypotheses, among the sign combination hypotheses, the sign combination hypothesis with the smallest cost can be predicted using the n signs.

Meanwhile, for example, the encoding apparatus can determine signs to be predicted among signs of residual coefficients in the current block, and predict the determined signs. The encoding apparatus may determine signs to be predicted according to RDO decision making among the signs of the residual coefficients of the current block.

In general, since the sign error of transform coefficients with large values has a relatively high impact on the reconstructed block, the signs of transform coefficients with large values can be relatively easy to predict. A sorting based approach may be applied to determine the signs to be predicted based on the above-described logic. For example, one way to sort the transform coefficients of a transform block may be based on the absolute value of the transform coefficient level. However, since two quantizers are used in video/image coding standards such as the VVC standard and ECM-2.0, the transform coefficient level may not accurately reflect quantization. Therefore, optimal performance cannot be obtained by sorting by transform coefficient level.

Figure 7:
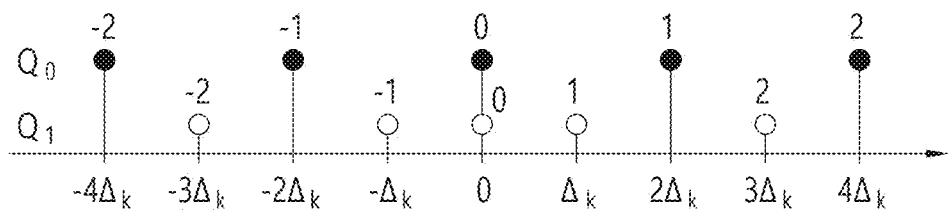
FIG. 7 shows quantization in quantizers of video/image coding standards.

FIG. 7 shows quantization in quantizers of video/image coding standards. The horizontal axis of FIG. 7 represents dequantized transform coefficients, and the vertical axis represents levels of dequantized transform coefficients. Referring to FIG. 7, for the same level value, the dequantized transform coefficient may be different due to two quantizers ($Q_0$ and $Q_1$ in FIG. 7) as shown below.

Case 1: Level=2, quantizer $Q_0$. Dequantized transform coefficient=$4\Delta_k$

Case 2: Level=2, quantizer $Q_1$. Dequantized transform coefficient=$3\Delta_k$

Both of the above-mentioned cases are level 2, but the dequantized transform coefficient ($4\Delta_k$) of case 1 may be larger than the dequantized transform coefficient ($3\Delta_k$) of case 2. In the method of deriving a coefficient to be sign predicted, which will be described later based on the above-described observation, transform coefficient sorting can be performed based on the qIdx value (dequantized transform coefficient=qIdx×$\Delta_k$).

qIdx at the transform coefficient level varies depending on the DQ status and can be calculated as follows:

$$qIdx = (\text{abs}(\text{level}) \ll 1) - (\text{state} \& 1) \qquad \text{[Equation 1]}$$

After the absolute values of the transform coefficient levels of the current block are decoded, the current block can be sorted based on the qIdx value. For example, the transform coefficient with the highest qIdx value may be located at the beginning of the current sorted block. The signs of the first maxNumPredSigns signs in the sorted current block can be predicted, and the remaining signs can be EP coded. That is, the transform coefficients of the current block can be sorted based on the qIdx value, and n transform coefficients can be determined as the transform coefficients to be sign predicted in the order of the qIdx value. Here, the current block may be a transform block (TB).

Afterwards, for example, if n (n<=maxNumPredSigns) signs are predicted in the current block, the encoding apparatus and the decoding apparatus can perform border reconstruction $2^n$ times corresponding to the $2^n$ sign combination hypotheses using a border-cost measure for each of the $2^n$ sign combination hypotheses. For example, if n (n<=maxNumPredSigns) signs are predicted in the current block, 2ⁿ simplified border reconstructions may be performed as described below. One reconstructed may be performed per specific combination of signs for the n residual coefficients. For example, for a particular reconstructed, only the leftmost pixels and topmost pixels of the block may be regenerated with the inverse transform added to the block prediction. The first inversion (vertical inversion) is complete, but the second inversion (horizontal inversion) can be faster because it only needs to generate the leftmost pixel and topmost pixel output. Additionally, for example, the number of inversion operations performed can be reduced by using a system of 'templates'. A template can be defined as an inversely transformed block when the sign is assumed to be 1 and inversely transformed from the coordinates of the coefficient for which the sign is to be predicted. Operations using the template can be performed as follows.

1. The inverse transformation can be performed by setting one of the coefficients for which the sine will be predicted to 1 and setting the remaining coefficients to 0. That is, for the sine of n coefficients to be predicted, the kth (k is 0 to n-1) prediction coefficient can be set as 1, and the remaining coefficients can be set as 0, thereby setting it as a template. The block when all n templates are added can be defined as the first sign combination hypothesis.

2. A sine combination hypothesis in which only one sign represents a negative number can be constructed using the first sine combination hypothesis and each template. Additionally, other sign combination hypotheses can also be constructed using the already constructed sign combination hypothesis and template.

For example, when three signs are predicted, storage/restoration and template application may be as shown in the tables below. That is, the templates and sign combination hypotheses when three signs are predicted may be as shown in the tables below.

TABLE 1

| Template Name | How to Create |
| --- | --- |
| T001 | inv xform single +ve 1$^{st}$ sign-hidden coeff |
| T010 | inv xform single +ve 2$^{nd}$ sign-hidden coeff |
| T100 | inv xform single +ve 3$^{rd}$ sign-hidden coeff |

TABLE 2

| Hypothesis | How to Create | Store for later reuse as |
| --- | --- | --- |
| H000 | inv xform all coeffs add to pred | H000 |
| H001 | H000 − 2*T001 | |
| H010 | H000 − 2*T010 | H010 |
| H011 | H010 − 2*T001 | |
| H100 | H000 − 2*T100 | H100 |
| H101 | H100 − 2*T001 | |
| H110 | H100 − 2*T010 | H110 |
| H111 | H110 − 2*T001 | |

Alternatively, the sign combination hypothesis can be constructed using the Gray code method. That is, the kth sign combination hypothesis may be composed of the k-1th sign combination hypothesis and one of n templates (where k is 1 to n-1). The first sine combination hypothesis (where all sines are positive) can be constructed as the sum of all templates as described previously. For example, when four signs are predicted, storage/restoration and template application may be as shown in the tables below. That is, the templates and sign combination hypotheses when four signs are predicted may be as shown in the tables below.

TABLE 3

| idx | signCurr | TXXXX = templateBuf[0:numPredSigns − 1] |
| --- | --- | --- |
| 0 | 0000 | 0000 |
| 1 | 0001 | Previous hypothesis − 2 * T0001 |
| 2 | 0011 | Previous hypothesis − 2 * T0010 |
| 3 | 0010 | Previous hypothesis + 2 * T0001 |
| 4 | 0110 | Previous hypothesis − 2 * T0100 |
| 5 | 0111 | Previous hypothesis − 2 * T0001 |
| 6 | 0101 | Previous hypothesis + 2 * T0010 |
| 7 | 0100 | Previous hypothesis + 2 * T0001 |
| 8 | 1100 | Previous hypothesis − 2 * T1000 |
| 9 | 1101 | Previous hypothesis − 2 * T0001 |
| 10 | 1111 | Previous hypothesis − 2 * T0010 |
| 11 | 1110 | Previous hypothesis + 2 * T0001 |
| 12 | 1010 | Previous hypothesis + 2 * T0100 |
| 13 | 1011 | Previous hypothesis − 2 * T0001 |
| 14 | 1001 | Previous hypothesis + 2 * T0010 |
| 15 | 1000 | Previous hypothesis + 2 * T0001 |

Referring to Table 3, the boundary reconstructed for the next sign combination hypothesis can be started by taking the previous hypothesis, requiring only a single predicted sign to be changed to construct the desired current hypothesis. This sign change can then be approximated by doubling and addition/subtraction on the sign combination hypothesis boundary of the template corresponding to the predicted sign. Approximations disclosed in the above-mentioned tables can be used only in the sign prediction process, not in the final reconstructed process. That is, the approximate values may be reconstructed values generated for the sign prediction process rather than the reconstructed sample generation process of the current block.

The cost of the sine combination hypothesis can be calculated as follows.

There may be a cost associated with each signature combination hypothesis, corresponding to the notion of image continuity across block boundaries. That is, the cost of the sign combination hypothesis may correspond to the concept of image continuity at the block boundary for the sign combination hypothesis. By minimizing the cost, a sine prediction value can be derived.

Figure 8:
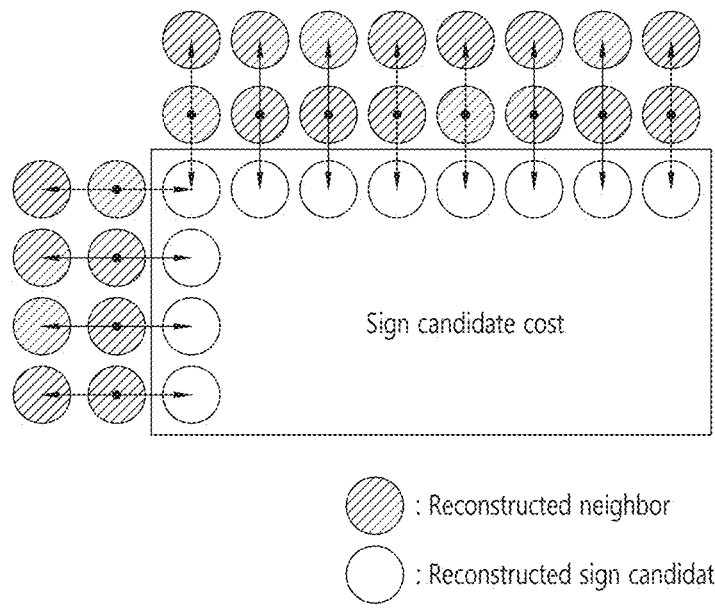
FIG. 8 exemplarily shows neighboring samples for deriving the cost of the sign combination hypothesis.

FIG. 8 exemplarily shows neighboring samples for deriving the cost of the sign combination hypothesis.

FIG. 8 discloses previously restored neighboring pixels and the leftmost pixels and topmost pixels of the current block for cost calculation. The neighboring pixels may include left neighboring pixels p−2,y and p−1,y, and upper neighboring pixels px,−2 and px,−2. Here, when the width and height of the current block are W and H, y may be 0 to H-1 and x may be 0 to W-1. For example, the cost can be derived as follows:

$$\text{cost} = \sum\nolimits_{x=o}^{w-1} |(-R_{x,-2} + 2R_{x,-1} - P_{x,0}) - r_{x,0}| + \quad \text{[Equation 2]}$$
$$\sum\nolimits_{y=o}^{h-1} |(-R_{-2,y} + 2R_{-1,y} - P_{0,y}) - r_{0,y}|$$

The cost function that derives the cost can be defined as the sum of the absolute second derivatives of the residual domain for the upper row and left column of the current block, as in the above-mentioned equation. Here, R may be the reconstructed neighboring pixel, P may be the predicted pixel of the current block, and r may be the residual hypothesis. Specifically, w may represent the width of the current block, h can represent the height of the current block, $R_{x,-2}$ may represent the upper neighboring pixel at the (x,−2) location, $R_{x,-1}$ may represent the upper neighboring pixel at the (x,−1) location, $P_{x,0}$ may represent the predicted pixel at position (x,0), $r_{x,0}$ may represent the hypothesis residual pixel at the (x,0) location, $R_{-2,y}$ can represent the left neighboring pixel at the (−2,y) position, $R_{-1,y}$ can represent the left neighboring pixel at the (−1,y) position, $P_{0,y}$ may represent the predicted pixel at (0,y) location, $r_{0,y}$ may represent the hypothesis residual pixel at the (0,y) location. Meanwhile, the $(-R_{-2}+2R_{-1}-P_0)$ term in the above-mentioned equation can be calculated only once per block, and then the cost calculation of the sign combination hypothesis can be calculated by subtracting only the residual hypothesis.

Meanwhile, sign prediction of residual coefficients can only be applied partially in the area of TU. The sign prediction area of the transform block can be performed up to 32×32 blocks. For example, the sign of the upper left M×N block of the transform block can be predicted. The values of M and N can be calculated as follows:

[Equation 3]

$$M=\min (\text{width}, 32)$$

$$N=\min (\text{height}, 32)$$

Here, width can represent the width of the transform block, and height can represent the height of the transform block. Additionally, sign prediction can be applied not only to coefficients after primary transformation (e.g. MTS, DCT2, etc.) but also to coefficients after LFNST mode. Additionally, to achieve a better gain/complexity trade-off, for example, up to 4 (i.e. n=4) transform coefficients for one LFNST transform block. Signs can be predicted.

For each sign to be predicted, the encoding device may search for the lowest-cost sign combination hypothesis that matches the true values of the signs already transmitted. On the other hand, for example, initially the sine residual may not be transmitted and the sine combination hypothesis with the lowest cost may simply be searched. The predicted value of the current cause of sign can be obtained from the searched cause combination hypothesis. That is, for example, the values of the n signs can be predicted by the sign combination hypothesis with the lowest cost among the sign combination hypotheses.

The sine residual may be sent as "0" if the prediction corresponds to the true value of the sign, otherwise it may be sent as "1". That is, if the value of the predicted sign is correct, a syntax element for the sign with a value of 0 can be transmitted, if the value of the predicted sign is incorrect, a syntax element for the sign with a value of 1 may be transmitted. The syntax element may also be called a sine residual.

The decoding device may parse coefficients, sine and sine residuals as part of the parsing process. The sine residuals can be parsed at the end of the TU, and then the decoding device can know the absolute values of all coefficients. Therefore, the decoding device can determine which sign is expected, based on the dequantized coefficient values for each predicted sign, the context model to be used to parse the sign prediction residual can be determined.

Additionally, knowledge of whether a prediction is "correct" or "incorrect" can simply be stored as part of the CU data of the block being parsed. The actual sine of the residual coefficient may not be known at this point.

In the reconstruct process, the decoding device may perform operations similar to the encoding device. That is, the decoding device can perform the above-described sign combination hypothesis generation and cost calculation operations for sign prediction.

For example, for n signs predicted in a TU, the decoding device can determine the costs of the sign combination hypotheses by performing boundary reconstruction 2n times. Afterwards, the actual sine to be applied to the residual coefficient with the predicted sine can be determined by an exclusive-or operation of the values below.

1. The predicted value of the sign.
2. "Correct" or "incorrect" data stored in the CU by bitstream parsing.

Meanwhile, in each TU where the signs of the coefficients are "hidden" using the existing sign data hiding mechanism, sine prediction can be performed by treating the corresponding coefficients (i.e., coefficients where the sine is hidden) as "not available" in the sine prediction process and using only other coefficients.

Meanwhile, as described above, sign prediction can be performed on the first n transform coefficients sorted in descending order by dequantized qIdx. Here, n can be defined as the number of transform coefficients that can be sign predicted in the current CG (coefficient group) from 1, or the value of n can be arbitrarily set to 8. Once the target for which sign prediction is performed is determined, up to 2n sign combinations can be generated, instead of calculating the cost by iterating over all the number of cases and constructing the reconstructed pixels, sign prediction can be performed by saving cost calculation complexity by specifying the above-described template and recycling repeated templates.

The optimal sign prediction value for each sign combination can be determined by a cost function. In other words, the optimal sign combination can be derived based on the costs of sign combinations, predicted signs can be determined from the sign combination derived above. For example, the cost of the sign combination hypothesis can be calculated by dequantizing and inversely transforming each coefficient of the sign combination hypothesis and then calculating the discontinuity with the already reconstructed samples from neighboring, among the sign combination hypotheses, the sign combination hypothesis with the minimum cost may be determined as the final sign prediction value. At this time, the second first-order inverse transformation (i.e., horizontal transform) can reduce complexity by inverse transforming only the top row and left column of the current block. Afterwards, when coding the actual sign flag, coding performance can be improved by context coding the sign prediction value and the value of the actual sign flag, that is, whether the predicted sign and the actual sign are the same. In other words, when sign prediction is applied as described above, unlike the existing sign flag, the amount of information bits for representing the sign of a block can be reduced and coding efficiency can be improved by context coding the syntax element related to the sign. That is, in the existing image coding system, when coding a sign, bypass coding was performed because the probability of occurrence was 50:50 and there was no trend between sign flags, when sign prediction is performed, the more accurate the sign prediction, the more likely it is that the syntax element will have a trend as to whether it is the same as the prediction, context coding can be performed, thereby achieving coding efficiency.

However, because sign prediction can be applied to n non-zero coefficients available within a 32×32 transform block, complexity may increase when calculating costs for large blocks or blocks with many transform coefficients. When sign prediction is applied to small-sized blocks or only to some areas within the transform block, the transform coefficient may be smaller than n, and in this case, complexity may be reduced. Additionally, if the transform block is a non-square block, it may have different characteristics than if it is a square block during the cost calculation process to determine discontinuity with neighboring blocks. Therefore, this document proposes an embodiment that checks whether the width and height of the current block are the same, and in other cases, calculates only the discontinuity cost for the larger of the width and height.

Figure 9:
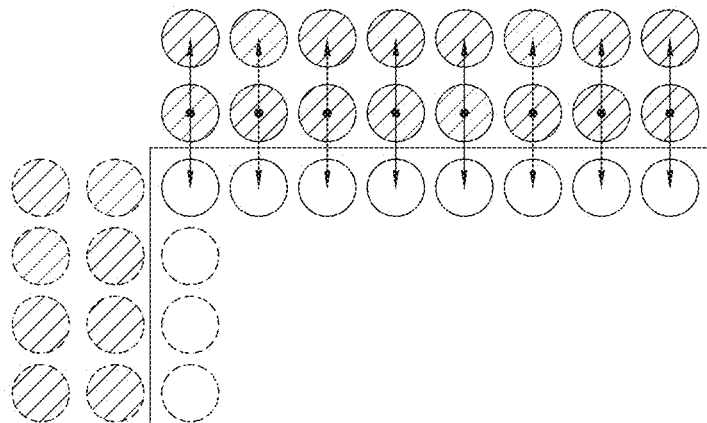
FIG. 9 shows an example of neighboring reconstructed samples and hypothesis reconstructed samples of the current block for calculating the cost of the sign combination hypothesis when the width and height of the current block are different.

FIG. 9 shows an example of neighboring reconstructed samples and hypothesis reconstructed samples of the current block for calculating the cost of the sign combination hypothesis when the width and height of the current block are different. Referring to FIG. 9, the current block may be a non-square block whose width is greater than its height. If the width of the current block is greater than the height, the cost of the sign combination hypothesis can be calculated based on the discontinuity with samples of the upper neighboring block of the current block. For example, if the width of the current block is greater than the height, the cost of the sign combination hypothesis can be calculated based only on the upper neighboring samples of the current block and the predicted samples and hypothesis residual samples of the upper row of the current block. For example, if the width of the current block is greater than the height, the cost of the sign combination hypothesis can be derived as follows.

$$\text{cost} = \sum\nolimits_{x=o}^{w-1} |(-R_{x,-2} + 2R_{x,-1} - P_{x,0}) - r_{x,0}| \qquad \text{[Equation 4]}$$

Here, w may represent the width of the current block, $R_{x,-2}$ may represent the upper neighboring pixel at the (x,−2) location, $R_{x,-1}$ may represent the upper neighboring pixel at the (x,−1) location, $P_{x,0}$ may represent the predicted pixel at position (x,0), and $r_{x,0}$ may represent the hypothesis residual pixel at the (x,0) location.

Also, for example, if the height of the current block is greater than the width, the cost of the sign combination hypothesis can be calculated based only on the neighboring samples to the left of the current block and the predicted samples and hypothesis residual samples in the left column of the current block. For example, if the height of the current block is greater than the width, the cost of the sign combination hypothesis can be derived as follows.

$$\text{cost} = \sum\nolimits_{y=o}^{h-1} |(-R_{-2,y} + 2R_{-1,y} - P_{0,y}) - r_{0,y}| \qquad \text{[Equation 5]}$$

Here, h can represent the height of the current block, $R_{-2,y}$ can represent the left neighboring pixel at the (−2,y) position, $R_{-1,y}$ can represent the left neighboring pixel at the (−1,y) position, Poly may represent the predicted pixel at (0,y) location, and $r_{0,y}$ may represent the hypothesis residual pixel at the (0,y) location.

Alternatively, in another embodiment, a method may be proposed to check whether the width and height of the current block are the same, and in other cases, adjust so that the same or similar number of pixels can be used according to the ratio of the width and height. For example, this document proposes an example of calculating the cost by checking whether the width and height of the current block are the same and adjusting the number of samples on the larger side of the width and height to be equal to the number of samples on the smaller side according to the ratio of the width and height.

Figure 10:
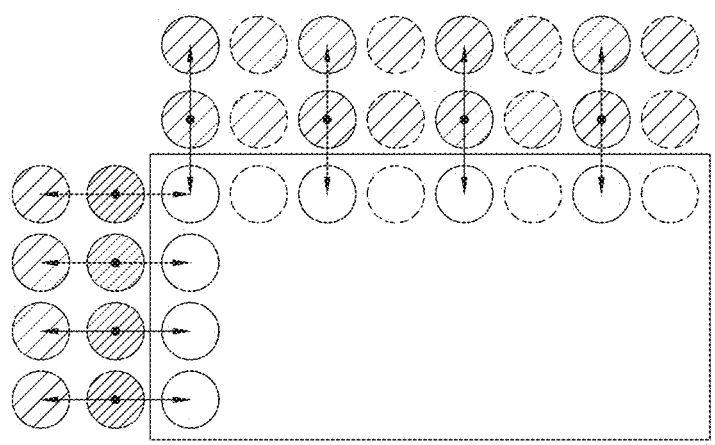
FIG. 10 shows an example of neighboring reconstructed samples and hypothesis reconstructed samples of the current block for calculating the cost of the sign combination hypothesis when the width and height of the current block are different.

FIG. 10 shows an example of neighboring reconstructed samples and hypothesis reconstructed samples of the current block for calculating the cost of the sign combination hypothesis when the width and height of the current block are different.

Referring to FIG. 10, the current block may be a non-square block whose width is twice as large as its height. For example, if the width of the current block is twice as large as the height, only 1 pixel out of 2 pixels corresponding to the width can be used for cost calculation. In other words, if the width of the current block is twice as large as the height, for the upper neighboring samples of the current block, the predicted samples and hypothesis residual samples of the upper row of the current block, only one sample out of 2 samples can be used for cost calculation. Or, for example, if the height of the current block is four times greater than the width, only 1 out of 4 reconstructed pixels corresponding to the height can be used for cost calculation. In other words, if the height of the current block is 4 times greater than the width, for the neighboring samples to the left of the current block, the predicted samples and hypothesis residual samples in the left column of the current block, only one sample out of 4 samples can be used for cost calculation. Through the above-described embodiments, more accurate discontinuity characteristics can be considered in sign prediction, or the complexity of cost calculation can be reduced compared to existing sign prediction methods.

For example, when the width of the current block is greater than the height, the cost of the sign combination hypothesis according to this embodiment can be derived as follows:

$$\text{cost} = \sum\nolimits_{x=o}^{w-1} \left|\left(-R_{\frac{w}{h}*x,-2} + 2R_{\frac{w}{h}*x,-1} - P_{\frac{w}{h}*x,0}\right) - r_{\frac{w}{h}*x,0}\right| + \qquad \text{[Equation 6]}$$

$$\sum\nolimits_{y=o}^{h-1} |(-R_{-2,y} + 2R_{-1,y} - P_{0,y}) - r_{0,y}|$$

Here, w can represent the width of the current block, h can represent the height of the current block, $R_{x,-2}$ may represent the upper neighboring pixel at the (x,−2) location, $R_{x,-1}$ may represent the upper neighboring pixel at the (x,−1) location, $P_{x,0}$ may represent the predicted pixel at position (x,0), $r_{x,0}$ may represent the hypothesis residual pixel at the (x,0) location, $R_{-2,y}$ can represent the left neighboring pixel at the (−2,y) position, $R_{-1,y}$ can represent the left neighboring pixel at the (−1,y) position, $P_{0,y}$ may represent the predicted pixel at (0,y) location, and $r_{0,y}$ may represent the hypothesis residual pixel at the (0,y) location.

Or, for example, when the height of the current block is greater than the width, the cost of the sign combination hypothesis according to this embodiment can be derived as in the following equation.

$$\text{cost} = \sum\nolimits_{x=o}^{w-1} |(-R_{x,-2} + 2R_{x,-1} - P_{x,0}) - r_{x,0}| + \qquad \text{[Equation 7]}$$

$$\sum\nolimits_{y=o}^{h-1} \left|\left(-R_{-2,\frac{h}{w}*y} + 2R_{-1,\frac{h}{w}*y} - P_{1,\frac{h}{w}*y}\right) - r_{0,\frac{h}{w}*y}\right|$$

Here, w can represent the width of the current block, h can represent the height of the current block, $R_{x,-2}$ may represent the upper neighboring pixel at the (x,−2) location, $R_{x,-1}$ may represent the upper neighboring pixel at the (x,−1) location, $P_{x,0}$ may represent the predicted pixel at position (x,0), $r_{x,0}$ may represent the hypothesis residual pixel at the (x,0) location, $R_{−2,y}$ can represent the left neighboring pixel at the (−2,y) position, $R_{−1,y}$ can represent the left neighboring pixel at the (−1,y) position, $P_{0,y}$ may represent the predicted pixel at (0,y) location, and $r_{0,y}$ may represent the hypothesis residual pixel at the (0,y) location.

Or, in another embodiment, if the current block is a residual block of an intra prediction block, depending on the intra prediction mode of the current block, a method may be proposed in which the reconstructed pixel of the neighboring block, which is mainly used, is determined as the pixel for cost calculation. This embodiment proposes a method that selectively uses neighboring reconstructed pixels for cost calculation based on the intra prediction mode of the current block when calculating the cost to select the optimal sign prediction hypothesis. That is, for example, this embodiment proposes a method of selecting neighboring samples based on the intra prediction mode of the current block and calculating the cost of the sign combination hypothesis based on the selected neighboring samples.

Figure 11:
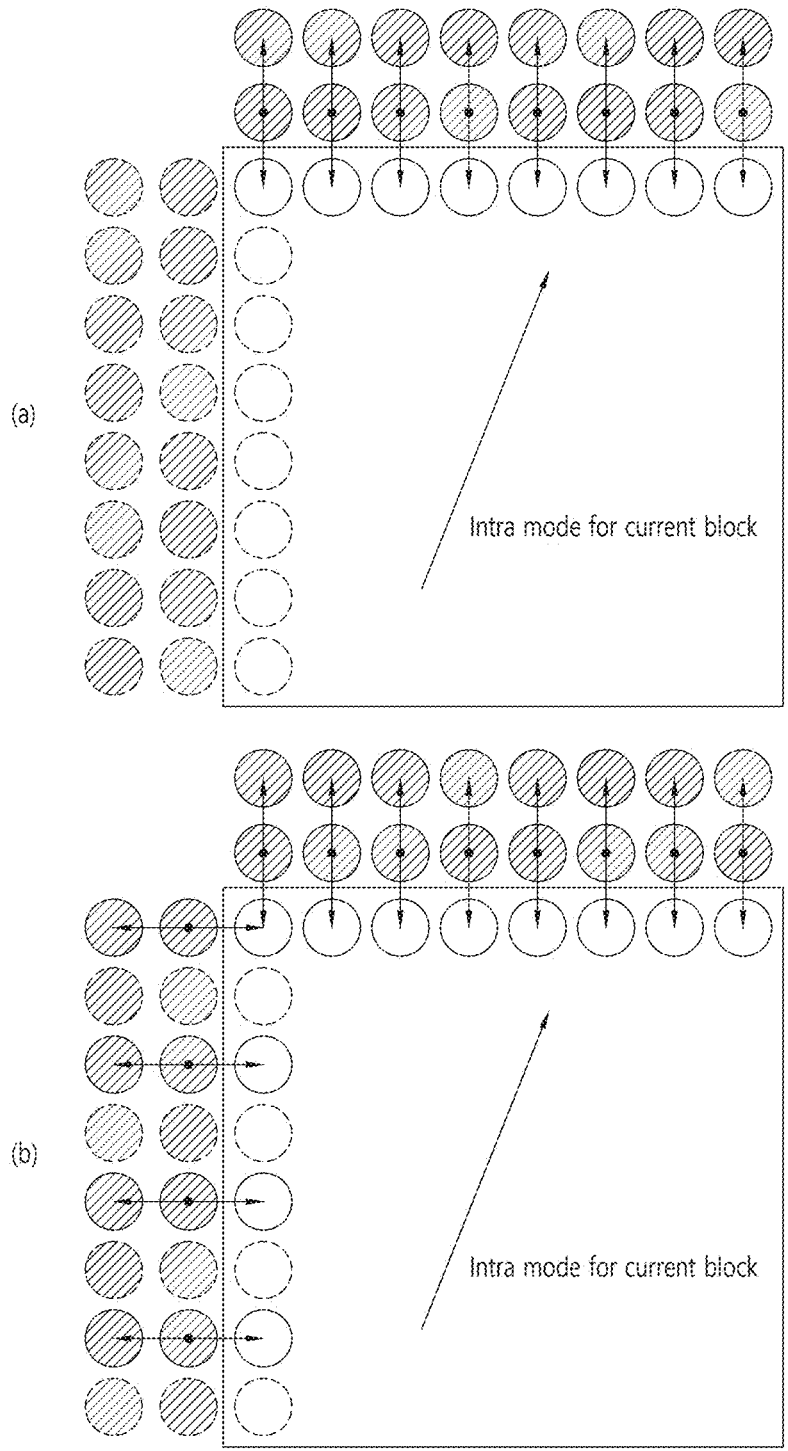
FIG. 11 shows an example of neighboring reconstructed samples and hypothesis reconstructed samples of the current block for calculating the cost of the sign combination hypothesis when the intra prediction mode is applied to the current block.

FIG. 11 shows an example of neighboring reconstructed samples and hypothesis reconstructed samples of the current block for calculating the cost of the sign combination hypothesis when the intra prediction mode is applied to the current block.

For example, FIG. 11 may show an embodiment of selecting neighboring reconstructed samples and hypothesis reconstructed samples of the current block for calculating the cost of the sign combination hypothesis when the current block is a transform block of a block with an intra prediction mode greater than the vertical intra prediction mode (i.e., for example, 50 intra prediction modes).

For example, if the intra prediction mode in the current block is an intra prediction mode that is larger than the vertical intra prediction mode, as shown in FIG. 11 (a), the cost for the sign combination hypothesis can be calculated using only the upper neighboring pixels of the current block and the temporarily reconstructed pixels (predicted pixels and hypothesis residual pixels) of the first row (i.e., top row) of the current block of the sign combination hypothesis. For example, if the intra prediction mode in the current block is an intra prediction mode that is larger than the vertical intra prediction mode, the cost of the sign combination hypothesis can be calculated based on Equation 4 described above.

Or, for example, if the intra prediction mode in the current block is an intra prediction mode that is larger than the vertical intra prediction mode, as shown in (b) of FIG. 11, all mainly used pixels are used, the cost for the sign combination hypothesis can be calculated using only some of the other reference samples. For example, if the intra prediction mode in the current block is an intra prediction mode that is larger than the vertical intra prediction mode, all temporarily reconstructed pixels (predicted pixels and hypothesis residual pixels) of the upper neighboring pixels of the current block and the first row (i.e., top row) of the current block of the sign combination hypothesis are used, the cost of the sign combination hypothesis can be calculated using only 1 pixel out of 2 pixels for the left neighboring pixel and the temporarily reconstructed pixels (predicted pixel and hypothesis residual pixel) of the first column (i.e., leftmost column) of the current block of the sign combination hypothesis. For example, if the intra prediction mode in the current block is an intra prediction mode that is larger than the vertical intra prediction mode, the cost of the sign combination hypothesis can be calculated based on Equation 7 described above.

Or, for example, if the intra-prediction mode in the current block is an intra-prediction mode that is smaller than the horizontal intra-prediction mode (i.e., intra-prediction mode number 18, for example), the cost for the sign combination hypothesis can be calculated using only the left neighboring pixel of the current block and the temporarily reconstructed pixels (predicted pixels and hypothesis residual pixels) of the first column (i.e., leftmost column) of the current block of the sign combination hypothesis. For example, if the intra prediction mode in the current block is an intra prediction mode smaller than the horizontal intra prediction mode, the cost of the sign combination hypothesis can be calculated based on Equation 5 described above.

Or, for example, if the intra prediction mode in the current block is an intra prediction mode that is smaller than the horizontal intra prediction mode, all commonly used pixels are used, the cost for the sign combination hypothesis can be calculated using only some of the other reference samples. For example, if the intra prediction mode in the current block is an intra prediction mode that is smaller than the horizontal intra prediction mode, all temporarily reconstructed pixels (predicted pixels and hypothesis residual pixels) of the left neighboring pixel of the current block and the first column (i.e., leftmost column) of the current block of the sign combination hypothesis are used, the cost of the sign combination hypothesis can be calculated using only 1 pixel out of 2 pixels for the upper neighboring pixel and the temporarily reconstructed pixels (predicted pixel and hypothesis residual pixel) of the first row (i.e., top row) of the current block of the sign combination hypothesis. For example, if the intra prediction mode in the current block is an intra prediction mode smaller than the horizontal intra prediction mode, the cost of the sign combination hypothesis can be calculated based on Equation 6 described above.

Alternatively, in another embodiment, a method may be proposed of dividing all intra prediction modes into M groups and selecting pixels to be used for cost calculation according to the group to which the intra prediction mode of the current block belongs.

As an example, intra prediction modes can be divided into four groups (M=4). For example, the first group may be designated as intra prediction modes smaller than intra prediction mode No. 18 (i.e., intra prediction mode No. 1 to intra prediction mode No. 17), the second group can be designated as intra prediction mode No. 18 to intra prediction mode No. 33, the third group can be designated as intra prediction mode No. 34 to intra prediction mode No. 50, and the fourth group may be designated as an intra prediction mode equal to or greater than the 50th intra prediction mode. In this case, if the intra prediction mode of the current block is included in the first group, the cost of the sign combination hypothesis can be calculated based only on the left neighboring sample and the sample of the first column (i.e., leftmost column) of the current block, if the intra prediction mode of the current block is included in the 4th group, the cost of the sign combination hypothesis can be calculated based only on the upper neighboring sample and the sample of the first row (i.e., top row) of the current block. Additionally, if the intra prediction mode of the current block is included in the second group, all left neighboring samples and samples from the first column (i.e. leftmost column) of the current block are used and the cost of the sign combination hypothesis can be calculated using only a portion of the upper neighboring samples and the first row (i.e., top row) of the current block, if the intra prediction mode of the current block is included in the 3rd group, all upper neighboring samples and samples from the first row (i.e. top row) of the current block are used and the cost of the sign combination hypothesis can be calculated using only part of the left neighboring sample and the sample of the first column (i.e., leftmost column) of the current block.

Additionally, this embodiment, which proposes a method of selecting samples for cost calculation based on the intra prediction mode of the current block, can be combined with the previously proposed embodiments.

Or, in another embodiment, when calculating the sign prediction hypothesis (sign prediction hypothesis), that is, the sign combination hypothesis, for the transform block of the inter prediction block, the specification proposes a method of calculating the cost using the reconstructed neighboring pixel of the current block along with the neighboring pixel of the prediction block, or calculating the cost using only the neighboring pixel of the prediction block.

Figure 12:
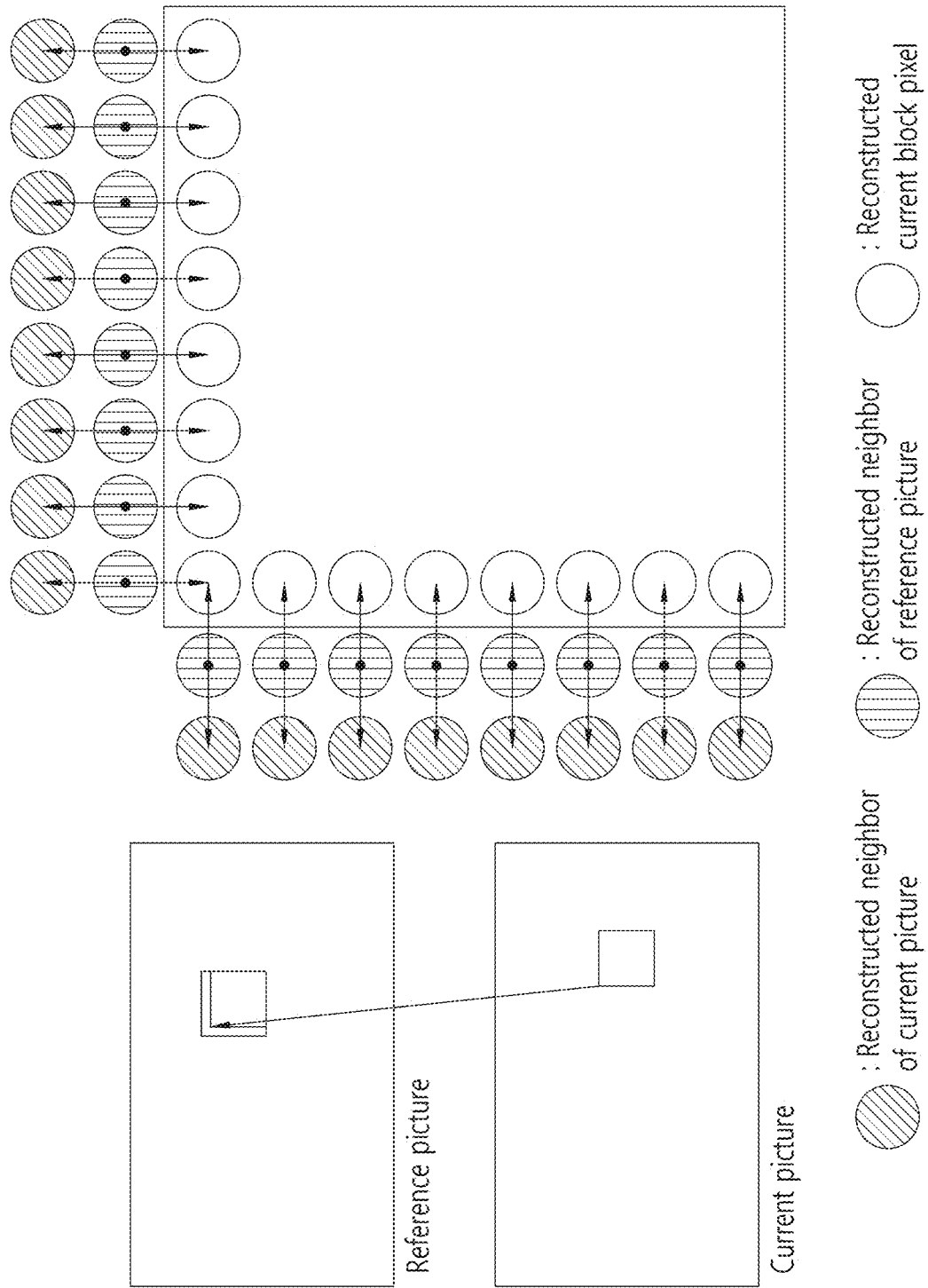
FIG. 12 shows an example of using neighboring reconstructed samples of a prediction block to calculate the cost of the sign combination hypothesis when the inter prediction mode is applied to the current block.

FIG. 12 shows an example of using neighboring reconstructed samples of a prediction block to calculate the cost of the sign combination hypothesis when the inter prediction mode is applied to the current block.

When inter prediction mode is applied to the current block to construct a prediction block from a reference picture based on motion information, in addition to the prediction block, neighboring pixels of the prediction block can also be fetched (fetch). In this embodiment, the neighboring pixel of the fetched prediction block can be used to calculate the cost of the sign combination hypothesis of sign prediction. FIG. 12 shows a method of using samples of a reference block and neighboring samples in a reference picture derived based on motion information of the current block to calculate the cost of the sign combination hypothesis. According to this embodiment, when inter prediction is applied to the current block, the cost of the sign combination hypothesis can be calculated using the upper neighboring sample and the left neighboring sample of the reference block in the reference picture derived based on the motion information of the current block. For example, the cost of the sign combination hypothesis according to this embodiment can be derived as follows:

$$\text{cost}_{INTER} = \sum_{x=o}^{w-1}|(-R_{x,-1} + 2P_{x,-1} - P_{x,0}) - r_{x,0}| + \sum_{y=0}^{h-1}|(-R_{-2,y} + 2P_{-1,y} - P_{0,y}) - r_{0,y}| \quad \text{[Equation 8]}$$

Here, R may be a neighboring pixel of the current block, P may be a predicted pixel of the current block, and r may be a residual hypothesis. Specifically, $R_{x,-2}$ may represent the upper neighboring pixel at the (x,−2) position in the current picture, $P_{x,-1}$ may represent the upper neighboring pixel of the reference block at the (x,−1) position in the reference picture, $P_{x,0}$ may represent the predicted pixel at position (x,0), $r_{x,0}$ may represent the hypothesis residual pixel at the (x,0) location, $R_{-2,y}$ can represent the neighboring pixel to the left of the (−2,y) position in the current picture, $P_{-1,y}$ may represent the left neighboring pixel of the reference block at the (−1,y) position in the reference picture, P0,y may represent the predicted pixel at the (0,y) location, and $r_{0,y}$ may represent the hypothesis residual pixel at the (0,y) location. Meanwhile, the $(-R_{-2}+2P_{-1}-P_0)$ term of the above-mentioned equation can be calculated only once per block, and then the reconstructed pixel of the current block can be constructed by subtracting only the residual hypothesis. Additionally, for example, if the current block is a positive prediction block, the neighboring pixel of the prediction block (i.e., the neighboring pixel of the reference block within the reference picture) may also be configured in the same manner as the prediction block configuration method.

Alternatively, an embodiment may be proposed in which the cost of the sign combination hypothesis is calculated using only neighboring pixels of the prediction block in the reference picture.

Figure 13:
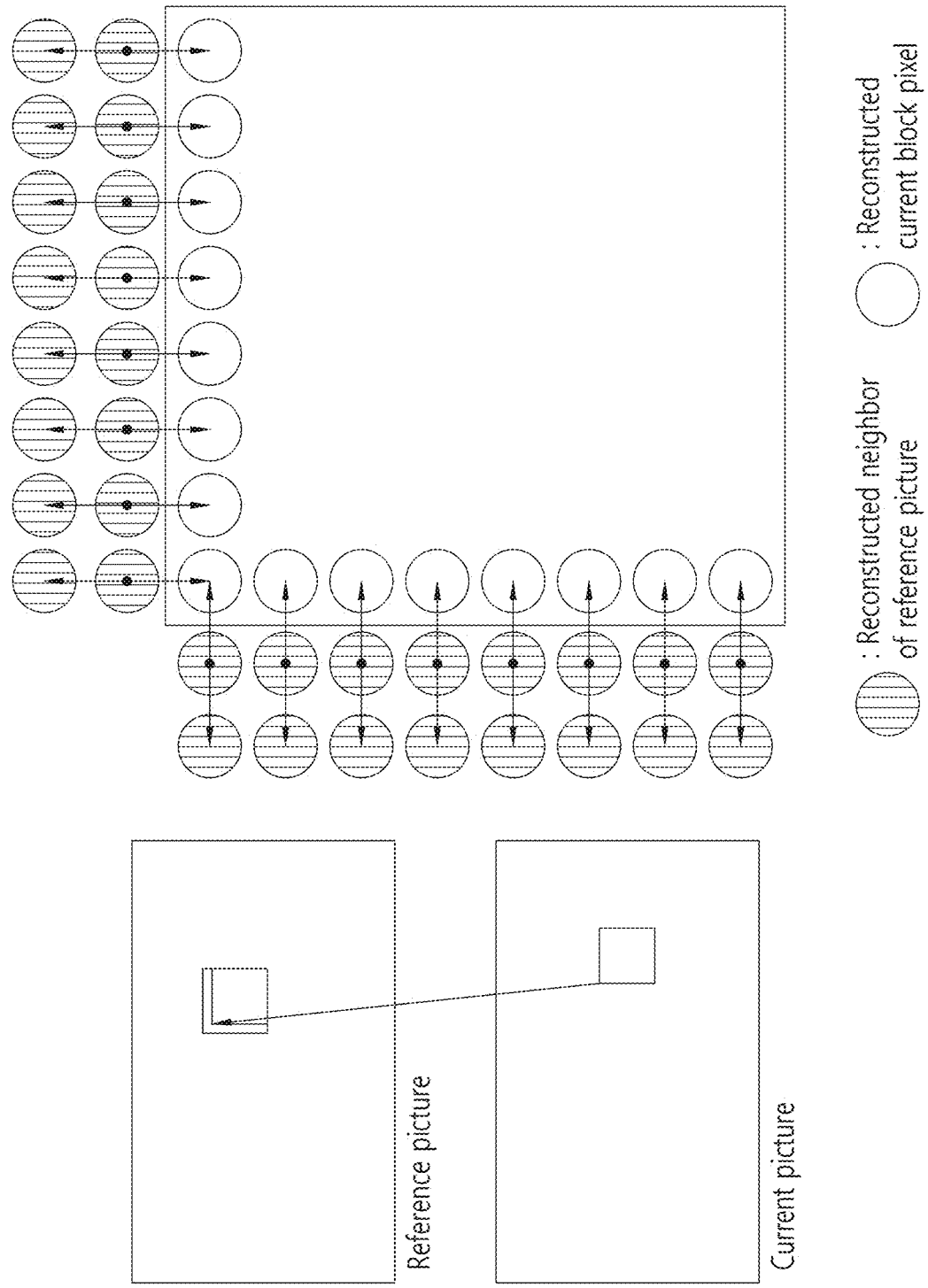
FIG. 13 shows an embodiment in which only neighboring reconstructed samples of the prediction block are used to calculate the cost of the sign combination hypothesis when the inter prediction mode is applied to the current block.

FIG. 13 shows an embodiment in which only neighboring reconstructed samples of the prediction block are used to calculate the cost of the sign combination hypothesis when the inter prediction mode is applied to the current block.

For example, if inter prediction is applied to the current block, the cost of the sign combination hypothesis can be calculated using only the upper neighboring sample and the left neighboring sample of the reference block in the reference picture derived based on the motion information of the current block. For example, the cost of the sign combination hypothesis according to this embodiment can be derived as follows:

$$\text{cost}_{INTER} = \sum_{x=o}^{w-1}|(-P_{x,-2} + 2P_{x,-1} - P_{x,0}) - r_{x,0}| + \sum_{y=o}^{h-1}|(-P_{-2,y} + 2P_{-1,y} - P_{0,y}) - r_{0,y}| \quad \text{[Equation 9]}$$

Here, P may be the predicted pixel of the current block, and r may be the residual hypothesis. Specifically, $P_{x,-2}$ may represent the upper neighboring pixel of the reference block at the (x,−2) position in the reference picture, $P_{x,-1}$ may represent the upper neighboring pixel of the reference block at the (x,−1) position in the reference picture, $P_{x,0}$ may represent the predicted pixel at the (x,0) location, and $r_{x,0}$ may represent the hypothesis residual pixel at the (x,0) location, $P_{-2,y}$ may represent the left neighboring pixel of the reference block at the (−2,y) position in the reference picture, $P_{-1,y}$ may represent the left neighboring pixel of the reference block at the (−1,y) position in the reference picture, $P_{0,y}$ may represent the predicted pixel at (0,y) location, and $r_{0,y}$ may represent the hypothesis residual pixel at the (0,y) location. Afterwards, the reconstructed pixels of the current block can be constructed by subtracting only the residual hypothesis. Additionally, for example, if the current block is a positive prediction block, the neighboring pixel of the prediction block (i.e., the neighboring pixel of the reference block within the reference picture) may also be configured in the same manner as the prediction block configuration method.

Or, in another embodiment, if the current block is a transform block for inter prediction mode, the specification proposes a method of determining whether to use the neighboring pixel of the prediction block in the reference picture to calculate the sign prediction hypothesis cost based on the distance between the current picture and the reference picture. For example, if inter prediction is applied to the current block, and the POC (picture order count) of the current picture and the reference picture is equal to or differs by a certain value, the cost of the sign combination hypothesis can be calculated based on Equation 2 described above, if the POC of the current picture and the reference picture is equal to or does not differ more than a certain value, the cost of the sign combination hypothesis can be calculated based on Equation 8 or Equation 9 described above. For example, the specific value may be 16. Or, for example, when inter prediction is applied to the current block and the reference picture index of the current block is equal to or greater than a certain value, the cost of the sign combination hypothesis can be calculated based on Equation 2 described above, if the reference picture index is not equal to or greater than a specific value, the cost of the sign combination hypothesis can be calculated based on Equation 8 or Equation 9 described above. Or, for example, if inter prediction is applied to the current block and the reference picture index of the current block is 0, the cost of the sign combination hypothesis can be calculated based on Equation 2 described above, if the reference picture index is not 0, the cost of the sign combination hypothesis can be calculated based on Equation 8 or Equation 9 described above. Or, for example, it may be determined whether to use the neighboring pixel of the prediction block in the reference picture to calculate the sign prediction hypothesis cost based on the temporal layer index of the reference picture and the temporal layer index of the current picture.

Or, in another example, the specification proposes a method of determining whether to use the neighboring pixel of the prediction block in the reference picture to calculate the sign prediction hypothesis cost based on the quantization parameter (QP) between the prediction blocks of the current block. For example, if inter prediction is applied to the current block and the QP of the current block and the QP of the prediction block in the reference picture are equal to or different from a certain value, the cost of the sign combination hypothesis can be calculated based on Equation 2 described above, if the QP of the current block and the QP of the prediction block in the reference picture are equal to or do not differ by more than a certain value, the cost of the sign combination hypothesis can be calculated based on Equation 8 or Equation 9 described above. For example, the specific value may be 5. Or, for example, only if the current block is a unidirectional prediction block, i.e. if unidirectional inter prediction is applied to the current block, the cost of the sign combination hypothesis can be calculated using neighboring pixels of the prediction block in the reference picture. In other words, for example, the cost of the sign combination hypothesis can be calculated based on Equation 8 or Equation 9 described above only when unidirectional inter prediction is applied to the current block. Or, for example, only if the current block is a bi-predicted block, i.e. if bi-directional inter prediction is applied to the current block, the cost of the sign combination hypothesis can be calculated using neighboring pixels of the prediction block in the reference picture. In other words, for example, the cost of the sign combination hypothesis can be calculated based on Equation 8 or Equation 9 described above only when bidirectional inter prediction is applied to the current block.

Additionally, this embodiment, which proposes a method of calculating the cost of the sign combination hypothesis using neighboring pixels of the prediction block in the reference picture, can be combined with the previously proposed embodiments.

Figure 14:
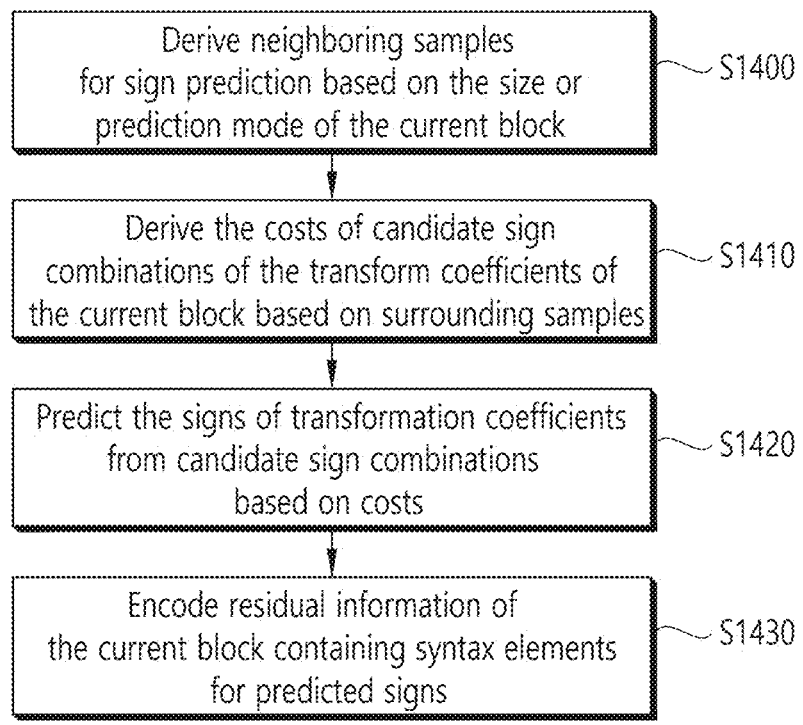
FIG. 14 schematically shows an image encoding method using the encoding apparatus according to this document.

FIG. 14 schematically shows an image encoding method using the encoding apparatus according to this document. The method disclosed in FIG. 14 may be performed by the encoding apparatus disclosed in FIG. 2. Specifically, for example, S1400 to S1420 of FIG. 14 may be performed by the residual processing unit of the encoding apparatus, and S1430 may be performed by the entropy encoding unit of the encoding apparatus. In addition, although not shown, the process of deriving a prediction sample for the current block may be performed by the prediction unit of the encoding apparatus, the process of generating a reconstructed sample and a reconstructed picture based on the prediction sample and the residual sample may be performed by an addition unit of the encoding apparatus.

The encoding apparatus derives neighboring samples for sign prediction based on the size or prediction mode of the current block (S1400). The encoding apparatus can derive neighboring samples for sign prediction of the current block. For example, the encoding apparatus may derive neighboring samples for sign prediction based on the size and/or prediction mode of the current block.

The encoding apparatus derives the costs of sign combination candidates of the transform coefficients of the current block based on the neighboring samples (S1410). The encoding apparatus can derive neighboring samples for sign prediction based on the size and/or prediction mode of the current block and can derive the costs of sign combination candidates of the transform coefficients of the current block based on the derived neighboring samples.

As an example, the neighboring samples may be derived based on the size of the current block.

For example, if the width of the current block is greater than the height of the current block, the cost of a specific sign combination candidate can be derived based on neighboring samples above the current block, prediction samples of the top row of the current block, and hypothesis residual samples for the specific sign combination candidate of the top row. For example, if the width of the current block is greater than the height of the current block, the cost of a specific sign combination candidate can be derived based only on upper neighboring samples of the current block, prediction samples of the top row of the current block, and hypothesis residual samples for the specific sign combination candidate of the top row. For example, if the width of the current block is greater than the height of the current block, the cost of the specific sign combination candidate can be derived based on Equation 4 described above. In Equation 4 above, $R_{x,-2}$ can represent the upper neighboring sample at the (x,-2) location, $R_{x,-1}$ may represent the upper neighboring sample at the (x,-1) location, $P_{x,0}$ may represent the predicted sample at position (x,0), and $r_{x,0}$ may represent the hypothesis residual sample at the (x,0) location.

Or, for example, if the height of the current block is greater than the width of the current block, the cost of a specific sign combination candidate can be derived based on neighboring samples to the left of the current block, prediction samples in the leftmost column of the current block, and hypothesis residual samples for the specific sign combination candidate in the leftmost column. For example, if the height of the current block is greater than the width of the current block, the cost of a specific sign combination candidate can be derived based only on neighboring samples to the left of the current block, prediction samples in the leftmost column of the current block, and hypothesis residual samples for the specific sign combination candidate in the leftmost column. For example, if the height of the current block is greater than the width of the current block, the cost of the specific sign combination candidate can be derived based on Equation 5 described above. In Equation 5 above, $R_{-2,y}$ can represent the left neighboring sample at the (-2,y) location, $R_{-1,y}$ can represent the left neighboring sample at the (-1,y) location, $P_{0,y}$ may represent the predicted sample at the (0,y) location, and $r_{0,y}$ may represent the hypothesis residual sample at the (0,y) location.

Or, for example, if the width of the current block is greater than the height of the current block, the cost of a specific sign combination candidate may be derived based on upper neighboring samples of the current block, prediction samples of the top row of the current block, and hypothesis residual samples for the specific sign combination candidate of the top row, the upper neighboring samples, the prediction samples, and the hypothesis residual samples may be selected in numbers equal to the height per row. For example, The cost of a specific sign combination candidate can be derived based on upper neighboring samples of the current block, prediction samples of the top row of the current block and hypothesis residual samples for the specific sign combination candidate of the top row and neighboring samples to the left of the current block, prediction samples of the leftmost column of the current block and hypothesis residual samples for the specific sign combination candidate of the leftmost column. If the width of the current block is greater than the height of the current block, the upper neighboring samples, the prediction sample, and the hypothesis residual sample may be selected in a number equal to the height per row. In this case, the cost of the specific sign combination candidate can be derived based on Equation 6 described above.

Or, for example, if the height of the current block is greater than the width of the current block, the cost of a specific sign combination candidate can be derived based on neighboring samples to the left of the current block, prediction samples in the leftmost column of the current block, and hypothesis residual samples for the specific sign combination candidate in the leftmost column, the left neighboring samples, the prediction samples, and the hypothesis residual samples may be selected in numbers equal to the width per column. For example, the cost of a specific sign combination candidate can be derived based on upper neighboring samples of the current block, prediction samples of the top row of the current block and hypothesis residual samples for the specific sign combination candidate of the top row and neighboring samples to the left of the current block, and prediction samples of the leftmost column of the current block and hypothesis residual samples for the specific sign combination candidate of the leftmost column, if the height of the current block is greater than the width of the current block, the left neighboring samples, the prediction samples, and the hypothesis residual samples may be selected in numbers equal to the width per column. In this case, the cost of the specific sign combination candidate can be derived based on Equation 7 described above.

Or, as an example, the neighboring samples may be derived based on the prediction mode of the current block.

For example, the neighboring samples may be derived based on the intra prediction mode of the current block.

For example, if the intra prediction mode of the current block is an intra prediction mode in which the vertical intra prediction mode is larger, the cost of a specific sign combination candidate can be derived based on neighboring samples above the current block, prediction samples of the top row of the current block, and hypothesis residual samples for the specific sign combination candidate of the top row. For example, if the intra prediction mode of the current block is an intra prediction mode in which the vertical intra prediction mode is larger, the cost of a specific sign combination candidate can be derived based only on upper neighboring samples of the current block, prediction samples of the top row of the current block, and hypothesis residual samples for the specific sign combination candidate of the top row. The intra prediction mode in which the vertical intra prediction mode is larger may be an intra prediction mode whose number is larger than the vertical intra prediction mode among intra prediction modes. For example, intra prediction modes in which the vertical intra prediction mode (e.g., intra prediction mode number 50) is larger may be intra prediction modes with numbers greater than 50.

Or, for example, if the intra prediction mode of the current block is an intra prediction mode in which the horizontal intra prediction mode is smaller, the cost of a specific sign combination candidate can be derived based on neighboring samples to the left of the current block, prediction samples in the leftmost column of the current block, and hypothesis residual samples for the specific sign combination candidate in the leftmost column. For example, if the intra prediction mode of the current block is an intra prediction mode in which the horizontal intra prediction mode is smaller, the cost of a specific sign combination candidate can be derived based only on neighboring samples to the left of the current block, prediction samples in the leftmost column of the current block, and hypothesis residual samples for the specific sign combination candidate in the leftmost column. The intra prediction mode in which the horizontal intra prediction mode is smaller may be an intra prediction mode whose number is smaller than the horizontal intra prediction mode among intra prediction modes. For example, intra prediction modes in which the horizontal intra prediction mode (e.g., intra prediction mode number 18) is smaller may be intra prediction modes with numbers less than 18.

Or, for example, if the intra prediction mode of the current block is an intra prediction mode in which the vertical intra prediction mode is larger, the cost of a specific sign combination candidate can be derived based on neighboring samples to the left of the current block, prediction samples in the leftmost column of the current block, and hypothesis residual samples for the specific sign combination candidate in the leftmost column, the left neighboring samples, the prediction samples, and the hypothesis residual samples may be selected in numbers equal to the width per column. For example, the cost of a specific sign combination candidate can be derived based on upper neighboring samples of the current block, prediction samples of the top row of the current block, hypothesis residual samples for the specific sign combination candidate of the top row, and left neighboring samples of the current block, and prediction samples of the leftmost column of the current block and hypothesis residual samples for the specific sign combination candidate of the leftmost column, if the intra prediction mode of the current block is an intra prediction mode with a larger vertical intra prediction mode, the left neighboring samples, the prediction samples, and the hypothesis residual samples may be selected in numbers equal to the width per column. In this case, the cost of the specific sign combination candidate can be derived based on Equation 7 described above.

Or, for example, if the intra prediction mode of the current block is an intra prediction mode in which the horizontal intra prediction mode is smaller, the cost of a specific sign combination candidate may be derived based on upper neighboring samples of the current block, prediction samples of the top row of the current block, and hypothesis residual samples for the specific sign combination candidate of the top row, the upper neighboring samples, the prediction samples, and the hypothesis residual samples may be selected in numbers equal to the height per row. For example, the cost of a specific sign combination candidate can be derived based on upper neighboring samples of the current block, prediction samples of the top row of the current block and hypothesis residual samples for the specific sign combination candidate of the top row and neighboring samples to the left of the current block, and prediction samples of the leftmost column of the current block and hypothesis residual samples for the specific sign combination candidate of the leftmost column, if the intra prediction mode of the current block is an intra prediction mode in which the horizontal intra prediction mode is smaller, the upper neighboring samples, the prediction samples, and the hypothesis residual samples may be selected in numbers equal to the height per row. In this case, the cost of the specific sign combination candidate can be derived based on Equation 6 described above.

Or, for example, intra prediction modes may be divided into M groups, and the neighboring samples may be derived according to the group to which the intra prediction mode of the current block belongs. For example, intra prediction modes may be divided into four groups, and if the intra prediction mode of the current block is included in the first group, the cost of a specific sign combination candidate can be derived based only on neighboring samples to the left of the current block, prediction samples in the leftmost column of the current block, and hypothesis residual samples for the specific sign combination candidate in the leftmost column. Or, if the intra prediction mode of the current block is included in the fourth group, the cost of a specific sign combination candidate can be derived based only on upper neighboring samples of the current block, prediction samples of the top row of the current block, and hypothesis residual samples for the specific sign combination candidate of the top row. Or, if the intra prediction mode of the current block is included in the second group, the cost of a specific sign combination candidate can be derived based on neighboring samples to the left of the current block, prediction samples of the leftmost column of the current block and hypothesis residual samples for the specific sign combination candidate of the leftmost column, upper neighboring samples of part of the current block, prediction samples of part of the top row of the current block, and hypothesis residual samples of part of the top row for the specific sign combination candidate. For example, if the intra prediction mode of the current block is included in the second group, the cost of a specific sign combination candidate can be derived based on neighboring samples to the left of the current block, prediction samples of the leftmost column of the current block and hypothesis residual samples for the specific sign combination candidate of the leftmost column and upper neighboring samples of the current block, prediction samples of the top row of the current block and hypothesis residual samples for the specific sign combination candidate of the top row, the upper neighboring samples, the prediction sample of the top row, and the hypothesis residual samples of the top row may be selected in a number equal to the height per row (column). Or, if the intra prediction mode of the current block is included in the third group, the cost of a specific sign combination candidate can be derived based on upper neighboring samples of the current block, prediction samples of the top row of the current block and hypothesis residual samples for the specific sign combination candidate of the top row and left neighboring samples of a part of the current block, prediction samples of part of the leftmost column of the current block and hypothesis residual samples of part of the specific sign combination candidate of the leftmost column. For example, if the intra prediction mode of the current block is included in the third group, the cost of a specific sign combination candidate can be derived based on upper neighboring samples of the current block, prediction samples of the top row of the current block and hypothesis residual samples for the specific sign combination candidate of the top row and neighboring samples to the left of the current block, prediction samples of the leftmost column of the current block and hypothesis residual samples for the specific sign combination candidate of the leftmost column, the left neighboring samples, the prediction sample of the leftmost column, and the hypothesis residual sample of the leftmost column may be selected in a number equal to the width per column.

Or, for example, when inter prediction is applied to the current block, neighboring samples of the reference block in the reference picture may be derived based on the motion information of the current block, the cost of a specific sign combination candidate can be derived based on the neighboring samples of the reference block. For example, when inter prediction is applied to the current block, neighboring samples of the reference block in the reference picture may be derived based on the motion information of the current block, the cost of a specific sign combination candidate can be derived based on the neighboring samples of the reference block and the neighboring samples of the current block. The cost can be derived based on Equation 8 described above. Or, for example, when inter prediction is applied to the current block, neighboring samples of the reference block in the reference picture may be derived based on the motion information of the current block, the cost of a specific sign combination candidate may be derived based on the neighboring samples of the reference block, prediction samples of the current block, and hypothesis residual samples of the current block for the specific sign combination candidate. That is, for example, when inter prediction is applied to the current block, neighboring samples of the current block may not be used to derive the cost. The cost can be derived based on Equation 9 described above.

Or, for example, when inter prediction is applied to the current block, whether neighboring samples of a reference block in a reference picture are used to derive the cost of a sign combination candidate can be determined based on the difference between the picture order count (POC) of the current picture and the POC of the reference picture. For example, when the difference between the POC of the current picture and the POC of the reference picture is equal to or greater than a certain value, neighboring samples of reference blocks in the reference picture can be used to derive the cost of sign combination candidates, if the difference between the POC of the current picture and the POC of the reference picture is not equal to or greater than a certain value, neighboring samples of reference blocks in the reference picture may not be used to derive the cost of a sign combination candidate. For example, the specific value may be 16.

Or, for example, when inter prediction is applied to the current block, whether neighboring samples of the reference block in the reference picture are used to derive the cost of the sign combination candidate can be determined based on the reference picture index for the current block. For example, if the reference picture index for the current block is less than a specific value, neighboring samples of reference blocks in the reference picture can be used to derive the cost of sign combination candidates, if the reference picture index for the current block is equal to or greater than a specific value, neighboring samples of reference blocks in the reference picture may not be used to derive the cost of a sign combination candidate. For example, the specific value may be 1.

Or, for example, when inter prediction is applied to the current block, whether neighboring samples of a reference block in a reference picture are used to derive the cost of a sign combination candidate can be determined based on the temporal layer index of the current picture and the temporal layer index of the reference picture.

Or, for example, when inter prediction is applied to the current block, whether neighboring samples of the reference block in the reference picture are used to derive the cost of the sign combination candidate can be determined based on the quantization parameter (QP) of the current block and the QP of the reference block. For example, if the difference between the QP of the current block and the QP of the reference block is equal to or not greater than a certain value, neighboring samples of reference blocks in the reference picture can be used to derive the cost of sign combination candidates, when the difference between the QP of the current block and the QP of the reference block is equal to or greater than a certain value, neighboring samples of reference blocks in the reference picture may not be used to derive the cost of a sign combination candidate. For example, the specific value may be 5.

Or, for example, when inter prediction is applied to the current block, whether neighboring samples of the reference block in the reference picture are used to derive the cost of the sign combination candidate can be determined based on whether inter prediction of the current block is unidirectional inter prediction. For example, if the inter prediction of the current block is unidirectional inter prediction, neighboring samples of reference blocks in the reference picture can be used to derive the cost of a sign combination candidate.

Or, for example, when inter prediction is applied to the current block, whether neighboring samples of the reference block in the reference picture are used to derive the cost of the sign combination candidate can be determined based on whether inter prediction of the current block is bidirectional inter prediction. For example, if the inter prediction of the current block is bidirectional inter prediction, neighboring samples of reference blocks in the reference picture can be used to derive the cost of a sign combination candidate.

Meanwhile, for example, the encoding apparatus may perform inter prediction mode or intra prediction mode on the current block to derive prediction samples. In addition, for example, the encoding apparatus may perform partial inverse transformation and border reconstruction on the sign combination candidate to derive hypothesis residual samples for the sign combination candidate, hypothesis reconstructed samples can be derived.

The encoding apparatus predicts the signs of the transform coefficients from the sign combination candidates based on the costs (S1420). The encoding apparatus can predict signs for the transform coefficients from the sign combination candidates based on the costs. For example, the encoding apparatus can predict the sign combination candidate with the smallest cost among the sign combination candidates using the signs of the transform coefficients. Meanwhile, a sign combination candidate may also be called a sign combination hypothesis.

Meanwhile, for example, the encoding apparatus may derive residual samples of the current block based on the predicted signs, a reconstructed picture can be generated based on the prediction samples of the current block and the residual samples.

The encoding apparatus encodes residual information of the current block including syntax elements for the predicted signs (S1430).

The encoding apparatus can encode residual information of the current block including syntax elements for the predicted signs. For example, the syntax elements for the predicted signs may indicate whether the predicted signs are accurate. That is, for example, a target syntax element among the syntax elements may indicate whether the predicted sign of the transform coefficient for the target syntax element is accurate. The syntax element for the predicted sign of the transform coefficient of the current block may represent the sign residual described above. Image information may include the residual information.

Meanwhile, for example, an encoding apparatus may generate and encode prediction mode information for the current block. For example, the prediction mode information may indicate an intra prediction mode or an inter prediction mode applied to the current block. Additionally, the encoding apparatus can generate and encode prediction-related information about the motion information of the current block. The motion information may include a motion vector and a reference picture index.

Additionally, for example, an encoding apparatus may encode residual information about the residual samples. The residual information may include syntax elements for predicted signs of transform coefficients of the current block.

The image information may include prediction mode information and/or residual information of the current block. Additionally, for example, the encoding device may encode image information and output it in the form of a bitstream.

Meanwhile, a bitstream containing the image information may be transmitted to a decoding device through a network or (digital) storage medium. Here, the network may include a broadcasting network and/or a communication network, and the digital storage medium may include various storage media such as USB, SD, CD, DVD, Blu-ray, HDD, and SSD.

Figure 15:
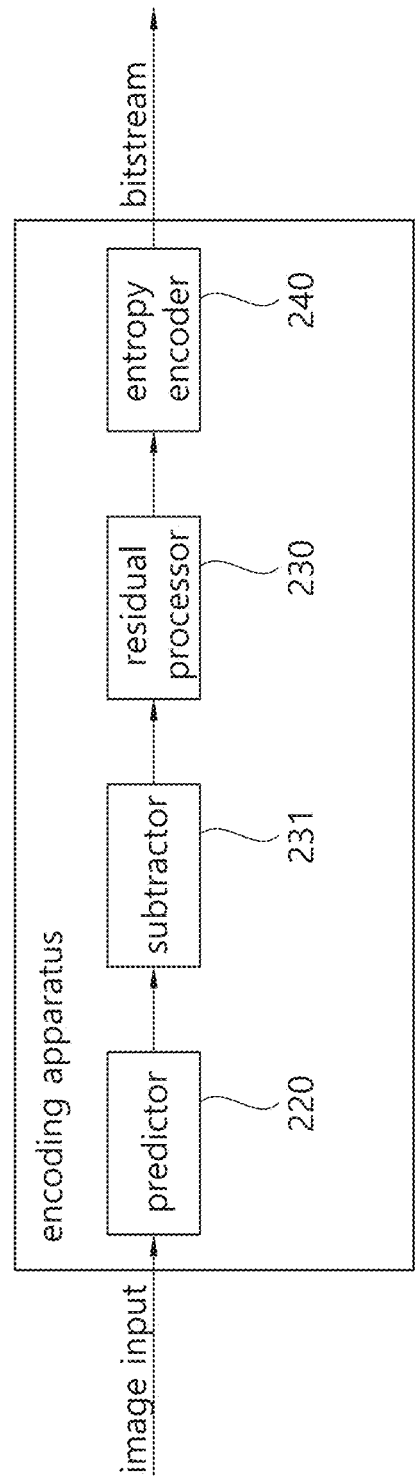
FIG. 15 schematically shows an encoding apparatus that performs the image encoding method according to this document.

FIG. 15 schematically shows an encoding apparatus that performs the image encoding method according to this document. The method disclosed in FIG. 14 can be performed by the encoding apparatus disclosed in FIG. 15. Specifically, for example, the residual processing unit of the encoding apparatus of FIG. 15 may perform steps S1400 to S1420, and the entropy encoding unit of the encoding apparatus may perform S1430. Additionally, although not shown, the process of generating reconstructed samples and reconstructed pictures based on the residual samples and prediction samples may be performed by an addition unit of the encoding apparatus.

Figure 16:
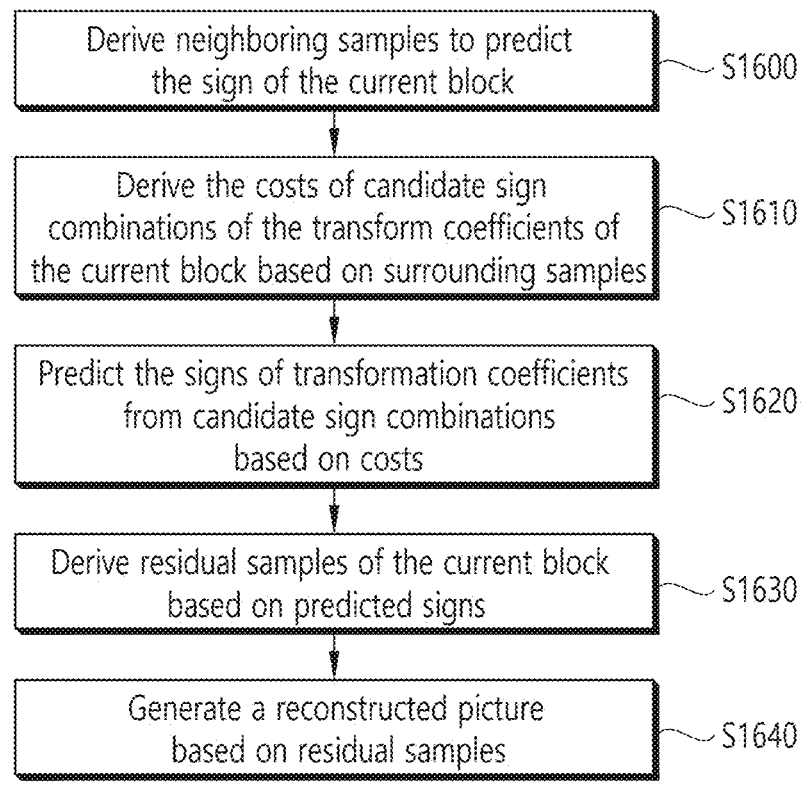
FIG. 16 schematically shows an image decoding method by the decoding device according to this document.

FIG. 16 schematically shows an image decoding method by the decoding device according to this document. The method disclosed in FIG. 16 can be performed by the decoding device disclosed in FIG. 3. Specifically, for example, S1000 to S2430 of FIG. 16 may be performed by the prediction unit of the decoding device. In addition, although not shown, the process of obtaining image information including information about intra prediction mode information and residual for the current block through a bitstream may be performed by an entropy decoding unit of the decoding device, the process of deriving the residual sample for the current block based on the residual information may be performed by an inverse transform unit of the decoding device, the process of generating a reconstructed picture based on the prediction sample and the residual sample may be performed by an addition unit of the decoding device.

The decoding apparatus derives neighboring samples for sign prediction of the current block (S1600). The decoding apparatus can derive neighboring samples for sign prediction of the current block. For example, the decoding apparatus may derive neighboring samples for sign prediction based on the size and/or prediction mode of the current block.

The decoding apparatus derives the costs of sign combination candidates of the transform coefficients of the current block based on the neighboring samples (S1610). The decoding apparatus can derive the costs of sign combination candidates of the transform coefficients of the current block based on the neighboring samples.

As an example, the neighboring samples may be derived based on the size of the current block.

For example, if the width of the current block is greater than the height of the current block, the cost of a specific sign combination candidate can be derived based on neighboring samples above the current block, prediction samples of the top row of the current block, and hypothesis residual samples for the specific sign combination candidate of the top row. For example, if the width of the current block is greater than the height of the current block, the cost of a specific sign combination candidate can be derived based only on upper neighboring samples of the current block, prediction samples of the top row of the current block, and hypothesis residual samples for the specific sign combination candidate of the top row. For example, if the width of the current block is greater than the height of the current block, the cost of the specific sign combination candidate can be derived based on Equation 4 described above. In Equation 4 above, $R_{x,-2}$ can represent the upper neighboring sample at the (x,-2) location, $R_{x,-1}$ may represent the upper neighboring sample at the (x,-1) location, $P_{x,0}$ may represent the predicted sample at position (x,0), and $r_{x,0}$ may represent the hypothesis residual sample at the (x,0) location.

Or, for example, if the height of the current block is greater than the width of the current block, the cost of a specific sign combination candidate can be derived based on neighboring samples to the left of the current block, prediction samples in the leftmost column of the current block, and hypothesis residual samples for the specific sign combination candidate in the leftmost column. For example, if the height of the current block is greater than the width of the current block, the cost of a specific sign combination candidate can be derived based only on neighboring samples to the left of the current block, prediction samples in the leftmost column of the current block, and hypothesis residual samples for the specific sign combination candidate in the leftmost column. For example, if the height of the current block is greater than the width of the current block, the cost of the specific sign combination candidate can be derived based on Equation 5 described above. In Equation 5 above, $R_{-2,y}$ can represent the left neighboring sample at the (-2,y) location, $R_{-1,y}$ can represent the left neighboring sample at the (-1,y) location, Poly may represent the predicted sample at the (0,y) location, and $r_{0,y}$ may represent the hypothesis residual sample at the (0,y) location.

Or, for example, if the width of the current block is greater than the height of the current block, the cost of a specific sign combination candidate may be derived based on upper neighboring samples of the current block, prediction samples of the top row of the current block, and hypothesis residual samples for the specific sign combination candidate of the top row, the upper neighboring samples, the prediction samples, and the hypothesis residual samples may be selected in numbers equal to the height per row. For example, the cost of a specific sign combination candidate can be derived based on upper neighboring samples of the current block, prediction samples of the top row of the current block and hypothesis residual samples for the specific sign combination candidate of the top row and neighboring samples to the left of the current block, prediction samples of the leftmost column of the current block and hypothesis residual samples for the specific sign combination candidate of the leftmost column, if the width of the current block is greater than the height of the current block, the upper neighboring samples, the prediction samples, and the hypothesis residual samples may be selected in numbers equal to the height per row. In this case, the cost of the specific sign combination candidate can be derived based on Equation 6 described above.

Or, for example, if the height of the current block is greater than the width of the current block, the cost of a specific sign combination candidate can be derived based on neighboring samples to the left of the current block, prediction samples in the leftmost column of the current block, and hypothesis residual samples for the specific sign combination candidate in the leftmost column, the left neighboring samples, the prediction samples, and the hypothesis residual samples may be selected in numbers equal to the width per column. For example, the cost of a specific sign combination candidate can be derived based on upper neighboring samples of the current block, prediction samples of the top row of the current block and hypothesis residual samples for the specific sign combination candidate of the top row and neighboring samples to the left of the current block, prediction samples of the leftmost column of the current block and hypothesis residual samples for the specific sign combination candidate of the leftmost column, if the height of the current block is greater than the width of the current block, the left neighboring samples, the prediction samples, and the hypothesis residual samples may be selected in numbers equal to the width per column. In this case, the cost of the specific sign combination candidate can be derived based on Equation 7 described above.

Or, as an example, the neighboring samples may be derived based on the prediction mode of the current block.

For example, the neighboring samples may be derived based on the intra prediction mode of the current block.

For example, if the intra prediction mode of the current block is an intra prediction mode in which the vertical intra prediction mode is larger, the cost of a specific sign combination candidate can be derived based on neighboring samples above the current block, prediction samples of the top row of the current block, and hypothesis residual samples for the specific sign combination candidate of the top row. For example, if the intra prediction mode of the current block is an intra prediction mode in which the vertical intra prediction mode is larger, the cost of a specific sign combination candidate can be derived based only on upper neighboring samples of the current block, prediction samples of the top row of the current block, and hypothesis residual samples for the specific sign combination candidate of the top row. The intra prediction mode in which the vertical intra prediction mode is larger is, among the intra-prediction modes, may be intra-prediction modes whose number is greater than that of the vertical intra-prediction mode. For example, intra prediction modes in which the vertical intra prediction mode (e.g., intra prediction mode number 50) is larger may be intra prediction modes with numbers greater than 50.

Or, for example, if the intra prediction mode of the current block is an intra prediction mode in which the horizontal intra prediction mode is smaller, the cost of a specific sign combination candidate can be derived based on neighboring samples to the left of the current block, prediction samples in the leftmost column of the current block, and hypothesis residual samples for the specific sign combination candidate in the leftmost column. For example, if the intra prediction mode of the current block is an intra prediction mode in which the horizontal intra prediction mode is smaller, the cost of a specific sign combination candidate can be derived based only on neighboring samples to the left of the current block, prediction samples in the leftmost column of the current block, and hypothesis residual samples for the specific sign combination candidate in the leftmost column. The intra prediction mode in which the horizontal intra prediction mode is smaller may be an intra prediction mode whose number is smaller than the horizontal intra prediction mode among intra prediction modes. For example, intra prediction modes in which the horizontal intra prediction mode (e.g., intra prediction mode number 18) is smaller may be intra prediction modes with numbers less than 18.

Or, for example, if the intra prediction mode of the current block is an intra prediction mode in which the vertical intra prediction mode is larger, the cost of a specific sign combination candidate can be derived based on neighboring samples to the left of the current block, prediction samples in the leftmost column of the current block, and hypothesis residual samples for the specific sign combination candidate in the leftmost column, the left neighboring samples, the prediction samples, and the hypothesis residual samples may be selected in numbers equal to the width per column. For example, the cost of a specific sign combination candidate can be derived based on upper neighboring samples of the current block, prediction samples of the top row of the current block and hypothesis residual samples for the specific sign combination candidate of the top row and neighboring samples to the left of the current block, prediction samples of the leftmost column of the current block and hypothesis residual samples for the specific sign combination candidate of the leftmost column, if the intra prediction mode of the current block is an intra prediction mode with a larger vertical intra prediction mode, the left neighboring samples, the prediction samples, and the hypothesis residual samples may be selected in numbers equal to the width per column. In this case, the cost of the specific sign combination candidate can be derived based on Equation 7 described above.

Or, for example, if the intra prediction mode of the current block is an intra prediction mode in which the horizontal intra prediction mode is smaller, the cost of a specific sign combination candidate may be derived based on upper neighboring samples of the current block, prediction samples of the top row of the current block, and hypothesis residual samples for the specific sign combination candidate of the top row, the upper neighboring samples, the prediction samples, and the hypothesis residual samples may be selected in numbers equal to the height per row. For example, the cost of a specific sign combination candidate can be derived based on upper neighboring samples of the current block, prediction samples of the top row of the current block and hypothesis residual samples for the specific sign combination candidate of the top row and neighboring samples to the left of the current block, prediction samples of the leftmost column of the current block and hypothesis residual samples for the specific sign combination candidate of the leftmost column, if the intra prediction mode of the current block is an intra prediction mode in which the horizontal intra prediction mode is smaller, the upper neighboring samples, the prediction samples, and the hypothesis residual samples may be selected in numbers equal to the height per row. In this case, the cost of the specific sign combination candidate can be derived based on Equation 6 described above.

Or, for example, intra prediction modes can be divided into M groups, the neighboring samples may be derived according to the group to which the intra prediction mode of the current block belongs. For example, intra prediction modes can be divided into four groups, if the intra prediction mode of the current block is included in the first group, the cost of a specific sign combination candidate can be derived based only on neighboring samples to the left of the current block, prediction samples in the leftmost column of the current block, and hypothesis residual samples for the specific sign combination candidate in the leftmost column. Or, if the intra prediction mode of the current block is included in the fourth group, the cost of a specific sign combination candidate can be derived based only on upper neighboring samples of the current block, prediction samples of the top row of the current block, and hypothesis residual samples for the specific sign combination candidate of the top row. Or, if the intra prediction mode of the current block is included in the second group, the cost of a specific sign combination candidate can be derived based on neighboring samples to the left of the current block, prediction samples of the leftmost column of the current block and hypothesis residual samples for the specific sign combination candidate of the leftmost column, upper neighboring samples of part of said current block, some prediction samples of the top row of the current block and some hypothesis residual samples for the specific sign combination candidate of the top row. For example, if the intra prediction mode of the current block is included in the second group, the cost of a specific sign combination candidate can be derived based on neighboring samples to the left of the current block, prediction samples of the leftmost column of the current block and hypothesis residual samples for the specific sign combination candidate of the leftmost column and upper neighboring samples of the current block, prediction samples of the top row of the current block and hypothesis residual samples for the specific sign combination candidate of the top row, the upper neighboring samples, the prediction sample of the top row, and the hypothesis residual samples of the top row may be selected in a number equal to the height per row (column). Or, if the intra prediction mode of the current block is included in the third group, the cost of a specific sign combination candidate can be derived based on upper neighboring samples of the current block, prediction samples of the top row of the current block and hypothesis residual samples for the specific sign combination candidate of the top row and left neighboring samples of a part of the current block, prediction samples of part of the leftmost column of the current block and hypothesis residual samples of part of the specific sign combination candidate of the leftmost column. For example, if the intra prediction mode of the current block is included in the third group, the cost of a specific sign combination candidate can be derived based on upper neighboring samples of the current block, prediction samples of the top row of the current block and hypothesis residual samples for the specific sign combination candidate of the top row and neighboring samples to the left of the current block, prediction samples of the leftmost column of the current block and hypothesis residual samples for the specific sign combination candidate of the leftmost column, and the left neighboring samples, the prediction sample of the leftmost column, and the hypothesis residual sample of the leftmost column may be selected in a number equal to the width per column.

Or, for example, when inter prediction is applied to the current block, neighboring samples of the reference block in the reference picture may be derived based on the motion information of the current block, the cost of a specific sign combination candidate can be derived based on the neighboring samples of the reference block. For example, when inter prediction is applied to the current block, neighboring samples of the reference block in the reference picture may be derived based on the motion information of the current block, the cost of a specific sign combination candidate can be derived based on the neighboring samples of the reference block and the neighboring samples of the current block. The cost can be derived based on Equation 8 described above. Or, for example, when inter prediction is applied to the current block, neighboring samples of the reference block in the reference picture may be derived based on the motion information of the current block, the cost of a specific sign combination candidate may be derived based on the neighboring samples of the reference block, prediction samples of the current block, and hypothesis residual samples of the current block for the specific sign combination candidate. That is, for example, when inter prediction is applied to the current block, neighboring samples of the current block may not be used to derive the cost. The cost can be derived based on Equation 9 described above.

Or, for example, when inter prediction is applied to the current block, whether neighboring samples of a reference block in a reference picture are used to derive the cost of a sign combination candidate can be determined based on the difference between the picture order count (POC) of the current picture and the POC of the reference picture. For example, when the difference between the POC of the current picture and the POC of the reference picture is equal to or greater than a certain value, neighboring samples of reference blocks in the reference picture can be used to derive the cost of sign combination candidates, if the difference between the POC of the current picture and the POC of the reference picture is equal to or not greater than a certain value, neighboring samples of reference blocks in the reference picture may not be used to derive the cost of a sign combination candidate. For example, the specific value may be 16.

Or, for example, when inter prediction is applied to the current block, whether neighboring samples of the reference block in the reference picture are used to derive the cost of the sign combination candidate can be determined based on the reference picture index for the current block. For example, if the reference picture index for the current block is less than a specific value, neighboring samples of reference blocks in the reference picture can be used to derive the cost of sign combination candidates, if the reference picture index for the current block is equal to or greater than a specific value, neighboring samples of reference blocks in the reference picture may not be used to derive the cost of a sign combination candidate. For example, the specific value may be 1.

Or, for example, when inter prediction is applied to the current block, whether neighboring samples of a reference block in a reference picture are used to derive the cost of a sign combination candidate can be determined based on the temporal layer index of the current picture and the temporal layer index of the reference picture.

Or, for example, when inter prediction is applied to the current block, whether neighboring samples of the reference block in the reference picture are used to derive the cost of the sign combination candidate can be determined based on the quantization parameter (QP) of the current block and the QP of the reference block. For example, if the difference between the QP of the current block and the QP of the reference block is equal to or not greater than a certain value, neighboring samples of reference blocks in the reference picture can be used to derive the cost of sign combination candidates, when the difference between the QP of the current block and the QP of the reference block is equal to or greater than a certain value, neighboring samples of reference blocks in the reference picture may not be used to derive the cost of a sign combination candidate. For example, the specific value may be 5.

Or, for example, when inter prediction is applied to the current block, whether neighboring samples of the reference block in the reference picture are used to derive the cost of the sign combination candidate can be determined based on whether inter prediction of the current block is unidirectional inter prediction. For example, if the inter prediction of the current block is unidirectional inter prediction, neighboring samples of reference blocks in the reference picture can be used to derive the cost of a sign combination candidate.

Or, for example, when inter prediction is applied to the current block, whether neighboring samples of the reference block in the reference picture are used to derive the cost of the sign combination candidate can be determined based on whether inter prediction of the current block is bidirectional inter prediction. For example, if the inter prediction of the current block is bidirectional inter prediction, neighboring samples of the reference block in the reference picture may be used to derive the cost of the sign combination candidate.

On the other hand, for example, the decoding apparatus can derive prediction samples by performing inter-prediction mode or intra-prediction mode for the current block based on prediction mode information obtained through a bitstream. In addition, for example, the decoding apparatus may perform partial inverse transformation and border reconstruction on the sign combination candidate to derive hypothesis residual samples for the sign combination candidate, hypothesis reconstructed samples can be derived.

The decoding apparatus predicts the signs of the transform coefficients from the sign combination candidates based on the costs (S1620). The decoding apparatus can predict signs for the transform coefficients from the sign combination candidates based on the costs. For example, the decoding apparatus can predict the sign combination candidate with the smallest cost among the sign combination candidates using the signs of the transform coefficients. Meanwhile, a sign combination candidate may also be called a sign combination hypothesis.

The decoding apparatus derives residual samples of the current block based on the predicted signs (S1630). The decoding apparatus can derive residual samples of the current block based on the predicted signs.

For example, the decoding apparatus can determine whether the predicted signs are accurate based on syntax elements for the predicted signs, based on the results of the determination, the signs of the transform coefficients can be derived. For example, the decoding apparatus can obtain residual information of the current block, the residual information may include syntax elements for the predicted signs. For example, the syntax elements for the predicted signs may indicate whether the predicted signs are accurate. That is, for example, a target syntax element among the syntax elements may indicate whether the predicted sign of the transform coefficient for the target syntax element is accurate. For example, if the target syntax element indicates that the predicted sign of the transform coefficient for the target syntax element is accurate, the decoding apparatus can determine that the predicted sign is accurate, the predicted sign can be derived as the sign of the transform coefficient. That is, for example, if the target syntax element indicates that the predicted sign of the transform coefficient is accurate, if the predicted sign is positive, the sign of the transform coefficient can be derived as a positive number, if the predicted sign is negative, the sign of the transform coefficient may be derived as a negative number. Or, for example, if the target syntax element indicates that the predicted sign of the transform coefficient for the target syntax element is incorrect, the decoding apparatus may determine that the predicted sign is incorrect, a sign opposite to the predicted sign can be derived as the sign of the transform coefficient. That is, for example, if the target syntax element indicates that the predicted sign of the transform coefficient is incorrect, if the predicted sign is positive, the sign of the transform coefficient can be derived as negative, if the predicted sign is negative, the sign of the transform coefficient can be derived as a positive number. The syntax element for the predicted sign of the transform coefficient of the current block may represent the sign residual described above.

Thereafter, for example, the decoding apparatus may derive the absolute values of the transform coefficients based on the residual information of the current block, residual samples for the transform coefficients can be derived based on the derived signs and the absolute values for the transform coefficients.

The decoding apparatus generates a reconstructed picture based on the residual samples (S1640). For example, a decoding apparatus can generate a reconstructed picture based on the residual samples.

Meanwhile, for example, the decoding apparatus may perform inter prediction mode or intra prediction mode for the current block based on prediction mode information obtained through a bitstream to derive prediction samples, the reconstructed picture can be generated through addition of the prediction samples and the residual samples. For example, the decoding apparatus may derive an intra prediction mode for the current block based on prediction mode information, prediction samples of the current block can be derived based on the intra prediction mode, reconstructed samples and reconstructed pictures can be generated through addition of the prediction samples and the residual samples. Or, for example, the decoding apparatus may determine that inter prediction is applied to the current block based on prediction mode information, motion information of the current block can be derived based on prediction-related information about the current block, a reference block within a reference picture can be derived based on the motion information, predicted samples of the current block can be derived based on the reference block, reconstructed samples and reconstructed pictures can be generated through addition of the prediction samples and the residual samples. As described above, in-loop filtering procedures such as deblocking filtering, SAO and/or ALF procedures can be applied to the reconstructed samples to improve subjective/objective image quality as needed.

Meanwhile, for example, a decoding apparatus can obtain image information of the current block through a bitstream. The image information may include prediction mode information and/or residual information of the current block. The residual information may include syntax elements for predicted signs of transform coefficients of the current block.

Figure 17:
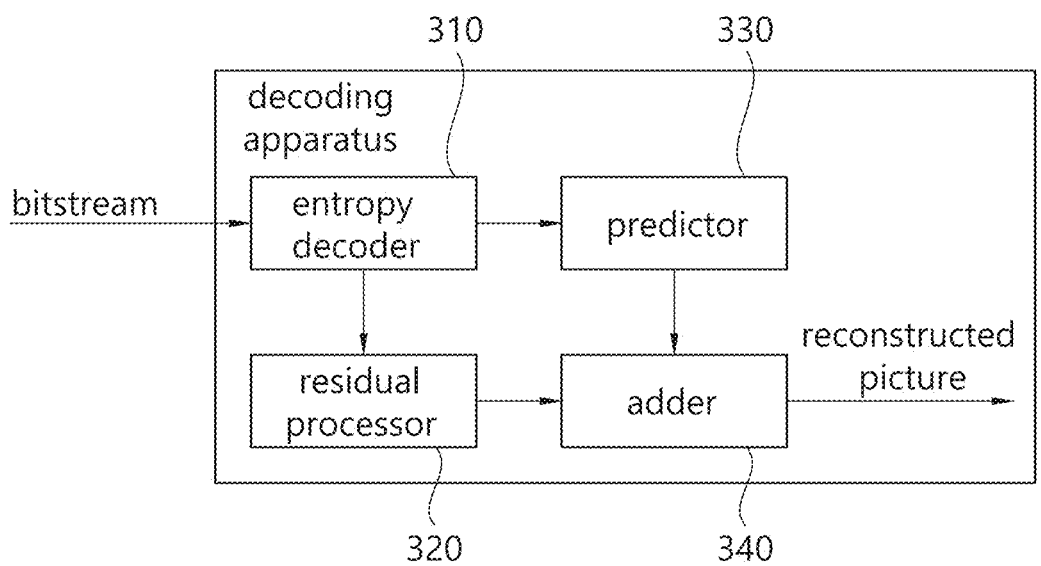
FIG. 17 schematically shows a decoding apparatus that performs the image decoding method according to this document.

FIG. 17 schematically shows a decoding apparatus that performs the image decoding method according to this document. The method disclosed in FIG. 16 can be performed by the decoding apparatus disclosed in FIG. 17. Specifically, for example, the residual processing unit of the decoding apparatus of FIG. 17 may perform steps S1600 to S1630 of FIG. 16, and the addition unit of the decoding apparatus of FIG. 17 may perform S1640 of FIG. 16.

According to this document described above, neighboring samples can be determined to derive the cost for sign combination candidates based on the size of the current block, through this, sign prediction accuracy can be improved by reflecting the characteristics of the image, and coding efficiency can be improved by reducing the complexity of cost calculation.

In addition, according to this document, neighboring samples can be determined for cost derivation for sign combination candidates based on the intra prediction mode of the current block, through this, sign prediction accuracy can be improved by reflecting the characteristics of the image, and coding efficiency can be improved by reducing the complexity of cost calculation.

In addition, according to this document, when inter prediction is applied to the current block, the cost for the sign combination candidate can be derived using the neighboring sample of the reference block derived, through this, sign prediction accuracy can be improved by reflecting the characteristics of the image and coding efficiency can be improved.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VOD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 18:
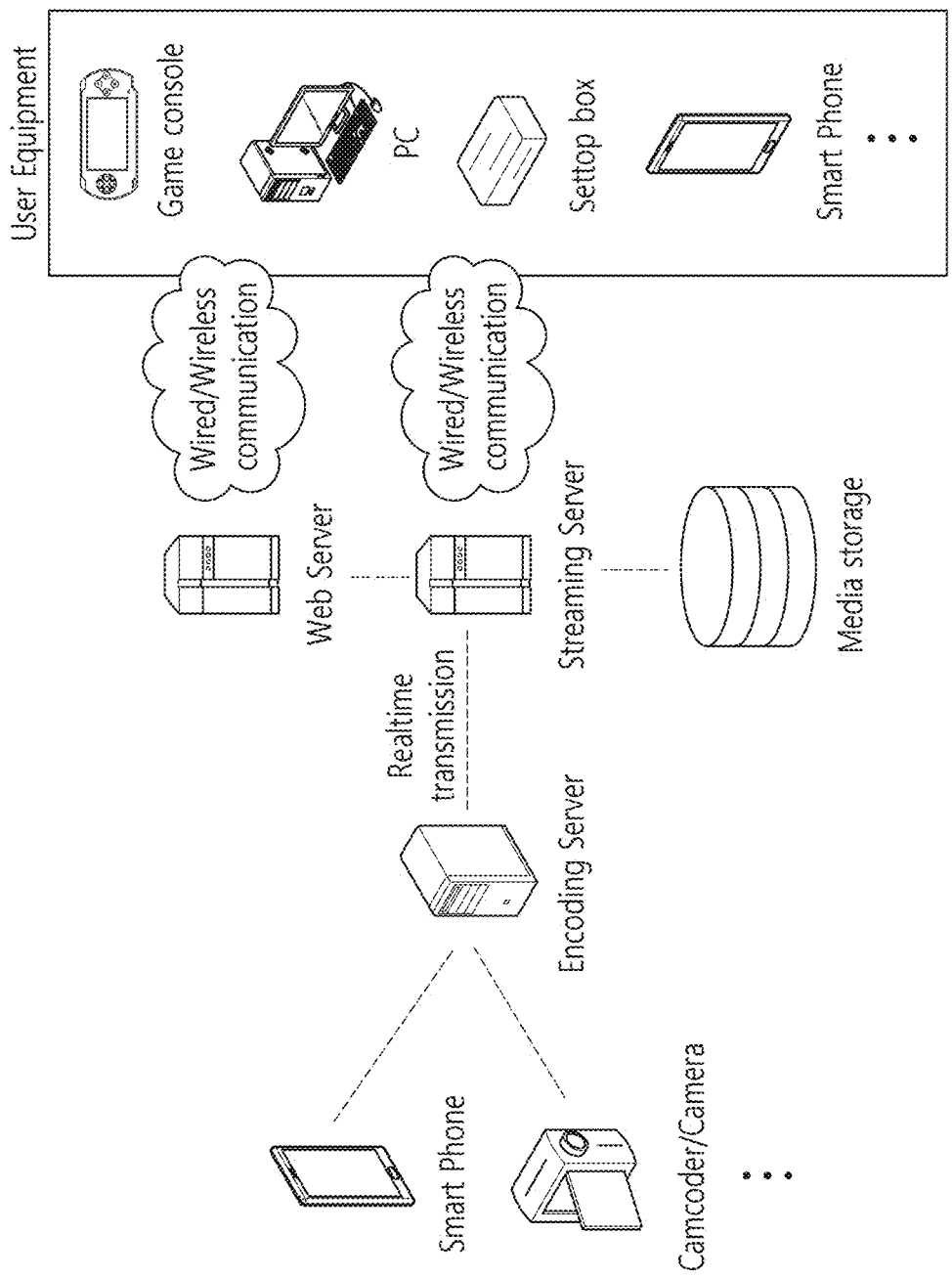
FIG. 18 illustrates a structural diagram of a contents streaming system to which the present disclosure is applied.

FIG. 18 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. A method for an image decoding, the method performed by a decoding apparatus and comprising:
deriving neighboring samples for a sign prediction of a current block;
deriving costs of sign combination candidates of transform coefficients of the current block based on the neighboring samples;
predicting signs of the transform coefficients from the sign combination candidates based on the costs;
deriving residual samples of the current block based on the predicted signs; and
generating a reconstructed picture based on the residual samples.

2. The method of claim 1, wherein the neighboring samples are derived based on a size of the current block.

3. The method of claim 2, wherein, when a width of the current block is greater than a height of the current block, a cost of a specific sign combination candidate is derived based on upper neighboring samples of the current block, predicted samples of a top row of the current block, and hypothesis residual samples for the specific sign combination candidate of the top row.

4. The method of claim 3, wherein, when the width of the current block is greater than the height of the current block, the cost of the specific sign combination candidate is derived based on the following equation, $$\text{cost} = \sum_{x=o}^{w-1} |(-R_{x,-2} + 2R_{x,-1} - P_{x,0}) - r_{x,0}|$$

where, w represents the width of the current block, $R_{x,-2}$ represents a upper neighboring sample at $(x,-2)$ position, $R_{x,-1}$ represents a upper neighboring sample at $(x,-1)$ position, $P_{x,0}$ represents a predicted sample at position $(x,0)$, and $r_{x,0}$ represents a hypothetical residual sample at location $(x,0)$.

5. The method of claim 2, wherein, when a height of the current block is greater than a width of the current block, a cost of a specific sign combination candidate is derived based on left neighboring samples of the current block, predicted samples in a left column of the current block, and hypothesis residual samples for the specific sign combination candidate in the left column.

6. The method of claim 5, wherein, when the height of the current block is greater than the width of the current block, the cost of the specific sign combination candidate is derived based on the following equation, $$\text{cost} = \sum_{y=o}^{h-1} |(-R_{-2,y} + 2R_{-1,y} - P_{0,y}) - r_{0,y}|$$

where, h represents the height of the current block, $R_{-2,y}$ represents a left neighboring sample at $(-2,y)$ location, $R_{-1,y}$ represents a left neighboring sample at $(-1,y)$ location, $P_{0,y}$ represents a predicted sample at (0,y) location, and $r_{0,y}$ represents a hypothetical residual sample at location (0,y).

7. The method of claim 2, wherein, when a width of the current block is greater than a height of the current block, a cost of a specific sign combination candidate is derived based on upper neighboring samples of the current block, predicted samples of a top row of the current block, and hypothesis residual samples for the specific sign combination candidate of the top row, and wherein the upper neighboring samples, the predicted samples, and the hypothesis residual samples are selected in numbers equal to the height per row.

8. The method of claim 2, wherein, when a height of the current block is greater than a width of the current block, a cost of a specific sign combination candidate is derived based on left neighboring samples of the current block, predicted samples in a left column of the current block, and hypothesis residual samples for the specific sign combination candidate in the left column, and wherein the left neighboring samples, the predicted samples, and the hypothesis residual samples are selected in numbers equal to the width per column.

9. The method of claim 1, wherein, when an intra prediction mode of the current block is an intra prediction mode larger than a vertical intra prediction mode, a cost of a specific sign combination candidate is derived based on upper neighboring samples of the current block, predicted samples of a top row of the current block, and hypothesis residual samples for the specific sign combination candidate of the top row.

10. The method of claim 1, wherein, when an intra prediction mode of the current block is an intra prediction mode smaller than a horizontal intra prediction mode, a cost of a specific sign combination candidate is derived based on left neighboring samples of the current block, predicted samples in a left column of the current block, and hypothesis residual samples for the specific sign combination candidate in the left column.

11. The method of claim 1, wherein, when inter prediction is applied to the current block, neighboring samples of a reference block of a reference picture derived based on motion information of the current block are used to derive the costs.

12. A method for an image encoding, the method performed by an encoding apparatus and comprising:
    deriving neighboring samples for a sign prediction based on a size or a prediction mode of the current block;
    deriving costs of sign combination candidates of transform coefficients of the current block based on the neighboring samples;
    predicting signs of the transform coefficients from the sign combination candidates based on the costs; and
    encoding residual information of the current block including syntax elements for the predicted signs,
    wherein a target syntax element among the syntax elements informs whether a predicted sign of a transform coefficient for the target syntax element is accurate.

13. The method of claim 12, wherein, when a width of the current block is greater than a height of the current block, a cost of a specific sign combination candidate is derived based on upper neighboring samples of the current block, predicted samples of a top row of the current block, and hypothesis residual samples for the specific sign combination candidate of the top row.

14. A method for transmitting data for image, the method comprising:
    obtaining a bitstream of image information including residual information including syntax elements for predicted signs of transform coefficients of a current block; and
    transmitting the data including the bitstream of the image information including the residual information,
    wherein a target syntax element among the syntax elements informs whether a predicted sign of a transform coefficient for the target syntax element is accurate,
    wherein the predicted signs are derived based on deriving neighboring samples for sign prediction based on a size or a prediction mode of the current block, deriving costs of sign combination candidates of the transform coefficients based on the neighboring samples, and predicting the signs of the transform coefficients from the sign combination candidates based on the costs.

* * * * *